United States Patent
Shigeta et al.

(10) Patent No.: US 10,833,613 B2
(45) Date of Patent: Nov. 10, 2020

(54) INVERTER CONTROL APPARATUS AND MOTOR DRIVE SYSTEM

(71) Applicants: KABUSHIKI KAISHA TOSHIBA, Minato-ku (JP); Toshiba Infrastructure Systems & Solutions Corporation, Kawasaki (JP)

(72) Inventors: Tomoaki Shigeta, Fuchu (JP); Shun Taniguchi, Fuchu (JP); Kazuya Yasui, Inagi (JP)

(73) Assignees: KABUSHIKI KAISHA TOSHIBA, Minato-ku (JP); Toshiba Infrastructure Systems & Solutions Corporation, Kasawaki (JP)

( * ) Notice: Subject to any disclaimer, the term of this patent is extended or adjusted under 35 U.S.C. 154(b) by 0 days.

(21) Appl. No.: 16/291,423

(22) Filed: Mar. 4, 2019

(65) Prior Publication Data

US 2019/0199253 A1   Jun. 27, 2019

Related U.S. Application Data

(63) Continuation of application No. PCT/JP2017/030980, filed on Aug. 29, 2017.

(30) Foreign Application Priority Data

Sep. 5, 2016  (JP) .................. 2016-173087

(51) Int. Cl.
*H02P 21/18* (2016.01)
*H02P 6/18* (2016.01)
(Continued)

(52) U.S. Cl.
CPC .............. *H02P 6/181* (2013.01); *H02P 6/183* (2013.01); *H02P 6/186* (2013.01); *H02P 21/141* (2013.01);
(Continued)

(58) Field of Classification Search
CPC .......... H02P 6/181; H02P 21/18; H02P 21/22; H02P 21/24; H02P 6/183; H02P 6/186; H02P 21/141
(Continued)

(56) References Cited

U.S. PATENT DOCUMENTS 5,652,495 A * 7/1997 Narazaki ............. H02P 21/0089
                                                          318/716
8,044,622 B2 * 10/2011 Yasui ...................... H02P 6/183
                                                          318/400.32
(Continued)

FOREIGN PATENT DOCUMENTS

CN     101341651 A      1/2009
CN     104796058 A      7/2015
(Continued)

OTHER PUBLICATIONS

International Search Report dated Nov. 28, 2017 in PCT/JP2017/030980 filed Aug. 29, 2017 (with English Translation).
(Continued)

*Primary Examiner* — Kawing Chan
(74) *Attorney, Agent, or Firm* — Oblon, McClelland, Maier & Neustadt, L.L.P.

(57) ABSTRACT

An inverter control apparatus and a motor drive system includes an inverter main circuit that drives a synchronous motor; an electric-current detector that detects an electric current flowing between the inverter main circuit and the synchronous motor; a command generator that generates an electric-current command value of an output electric current that is output from the inverter main circuit to the synchronous motor, in accordance with a torque command that is supplied externally; and an electric-current controller that generates a voltage command value for the inverter main circuit so that the electric-current command value and a detected electric-current value detected in the electric-cur-
(Continued)

rent detector are equal to each other. The command generator generates the electric-current command value so that a fundamental wave current that is equal to or greater than a threshold is supplied to the synchronous motor, in driving the inverter main circuit.

5 Claims, 20 Drawing Sheets

(51) Int. Cl.
    *H02P 21/22* (2016.01)
    *H02P 21/24* (2016.01)
    *H02P 21/14* (2016.01)

(52) U.S. Cl.
    CPC .............. *H02P 21/18* (2016.02); *H02P 21/22* (2016.02); *H02P 21/24* (2016.02)

(58) Field of Classification Search
    USPC ..................................... 318/400.32
    See application file for complete search history.

(56) References Cited

U.S. PATENT DOCUMENTS

| | | | | |
|---|---|---|---|---|
| 9,143,068 B2* | 9/2015 | Lin | ........................ | H02P 21/32 |
| 9,948,224 B1* | 4/2018 | Huh | ........................ | H02P 21/24 |
| 2004/0257028 A1 | 12/2004 | Schulz et al. | | |
| 2007/0241715 A1 | 10/2007 | Fujiwara et al. | | |
| 2008/0111516 A1* | 5/2008 | Inokuma | .................. | H02P 21/14 |
| | | | | 318/799 |
| 2009/0200974 A1* | 8/2009 | Yasui | ...................... | H02P 6/183 |
| | | | | 318/400.33 |
| 2010/0194319 A1* | 8/2010 | Ito | ........................... | H02P 21/14 |
| | | | | 318/400.13 |
| 2011/0248659 A1* | 10/2011 | Balazovic | ................ | H02P 6/183 |
| | | | | 318/400.33 |
| 2011/0285337 A1* | 11/2011 | Taniguchi | ............... | H02P 27/08 |
| | | | | 318/400.34 |
| 2013/0049656 A1* | 2/2013 | Yasui | ...................... | H02P 21/00 |
| | | | | 318/400.02 |
| 2014/0009147 A1* | 1/2014 | Taniguchi | ............ | G01R 33/028 |
| | | | | 324/258 |
| 2014/0152207 A1 | 6/2014 | Sasaki et al. | | |
| 2015/0207446 A1 | 7/2015 | Kakihara et al. | | |
| 2015/0357956 A1 | 12/2015 | Shimada et al. | | |
| 2016/0079900 A1* | 3/2016 | Ogi | ......................... | H02P 21/22 |
| | | | | 318/400.02 |
| 2016/0226409 A1* | 8/2016 | Ogawa | .................. | H02P 27/085 |
| 2018/0191285 A1* | 7/2018 | Shigeta | ................... | H02P 21/06 |

FOREIGN PATENT DOCUMENTS

| | | |
|---|---|---|
| CN | 105027422 A | 11/2015 |
| JP | 6-296386 | 10/1994 |
| JP | H08-266096 A | 10/1996 |
| JP | 10-337100 A | 12/1998 |
| JP | 2005-110343 A | 4/2005 |
| JP | 2007-525137 | 8/2007 |
| JP | 2009-118557 | 5/2009 |
| JP | 2012-161143 | 8/2012 |
| JP | 2013-70548 | 4/2013 |
| JP | 2013-070621 A | 4/2013 |
| JP | 5281339 B2 | 9/2013 |
| JP | 5425173 B2 | 2/2014 |
| JP | 2014-176236 | 9/2014 |
| JP | 2015-6067 | 1/2015 |
| JP | 2015-136237 | 7/2015 |
| WO | WO 2016/121237 A1 | 8/2016 |
| WO | WO 2016/121751 A1 | 8/2016 |

OTHER PUBLICATIONS

Written Opinion dated Nov. 28, 2017 in PCT/JP2017/030980 filed Aug. 29, 2017.
Singaporean Search Report dated Jan. 3, 2020, in Patent Application No. 11201901637V.
Extended European Search Report dated Mar. 12, 2020, in Patent Application No. 17846504.3.

\* cited by examiner

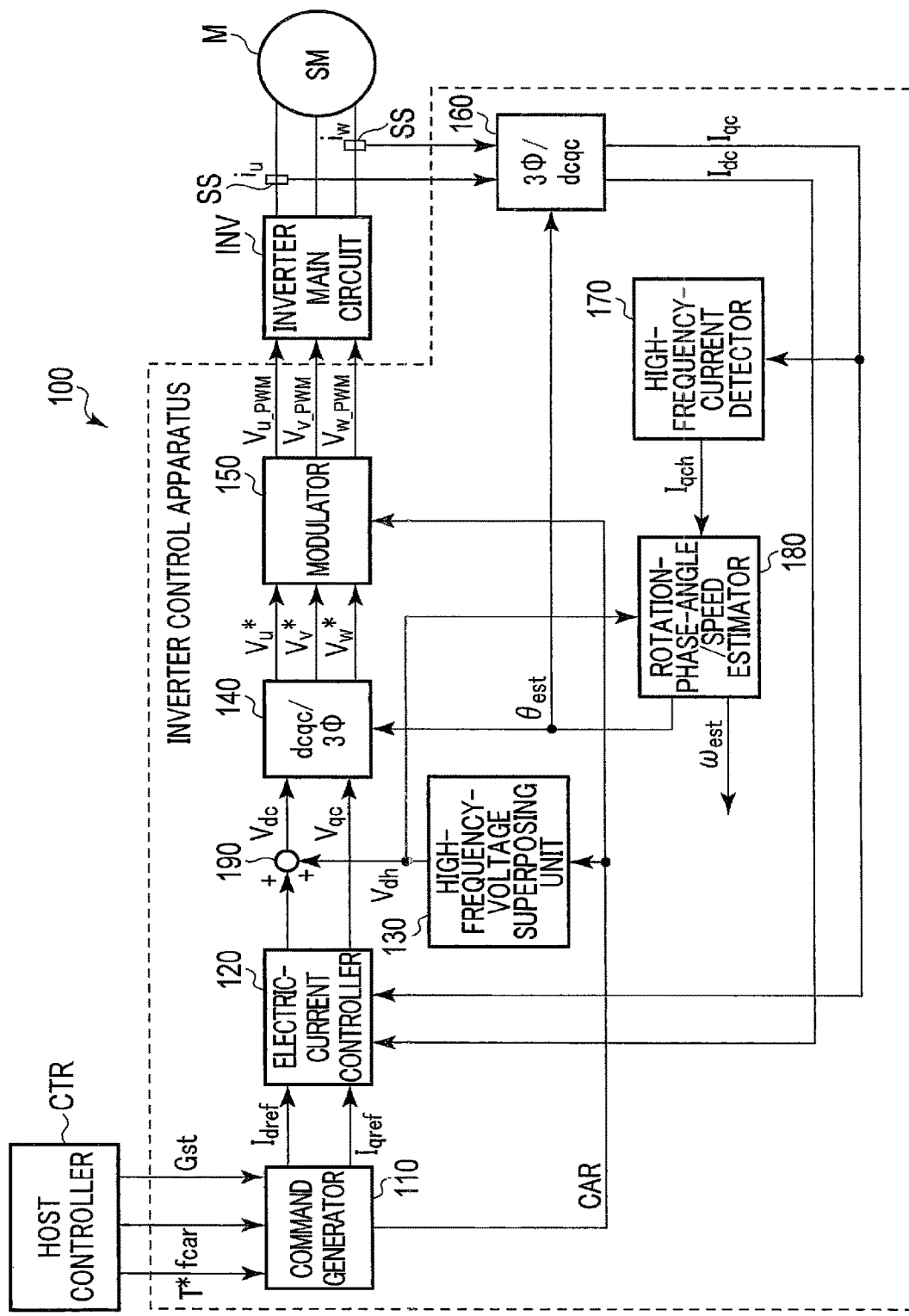
F I G. 1

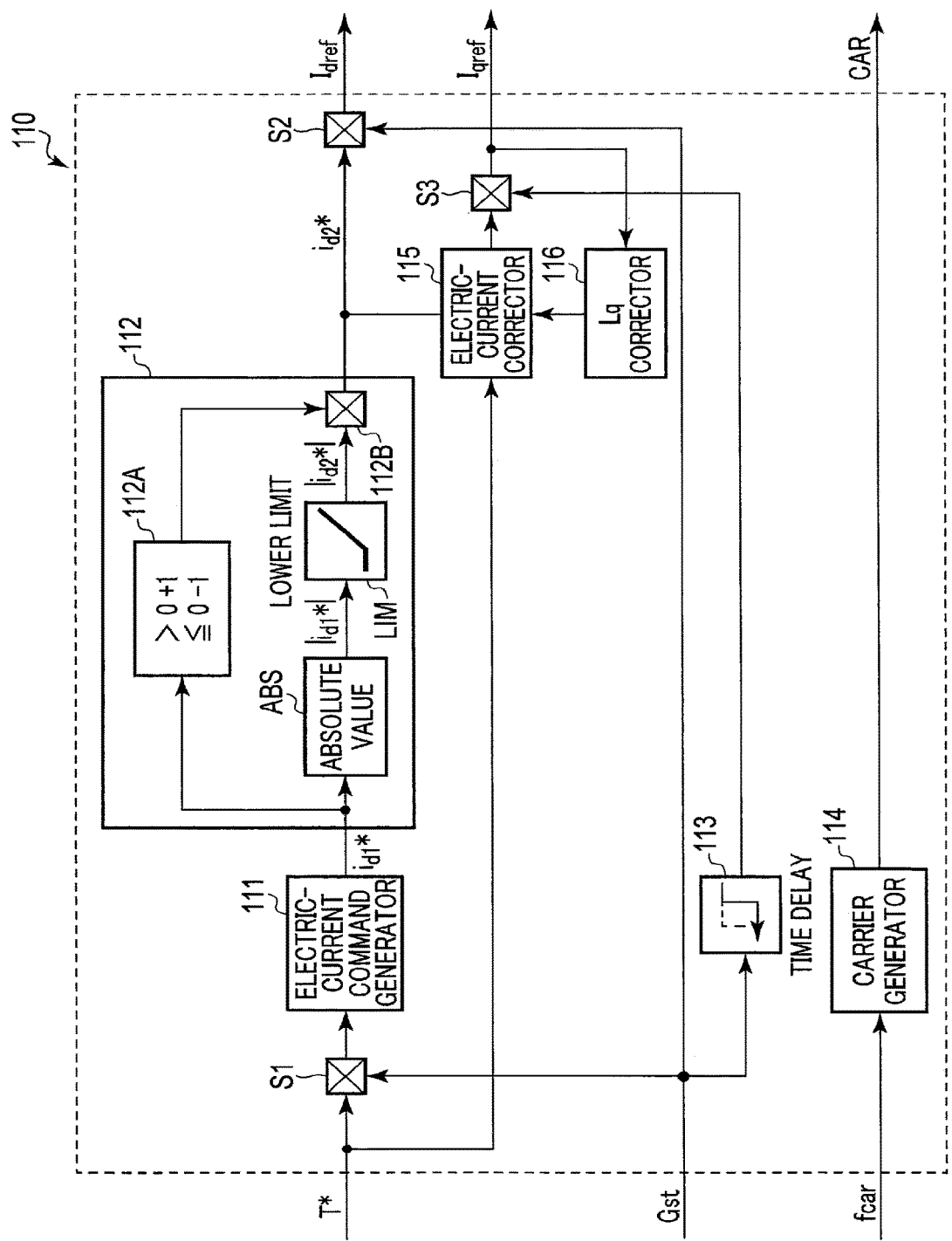
F I G. 6

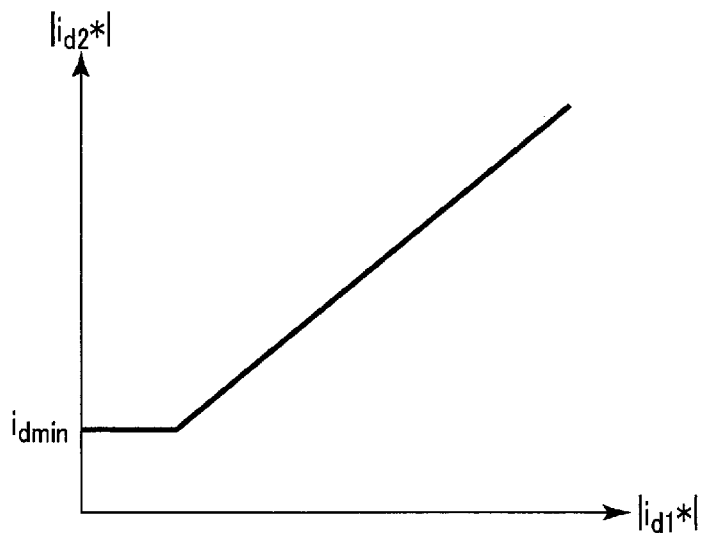
F I G. 7
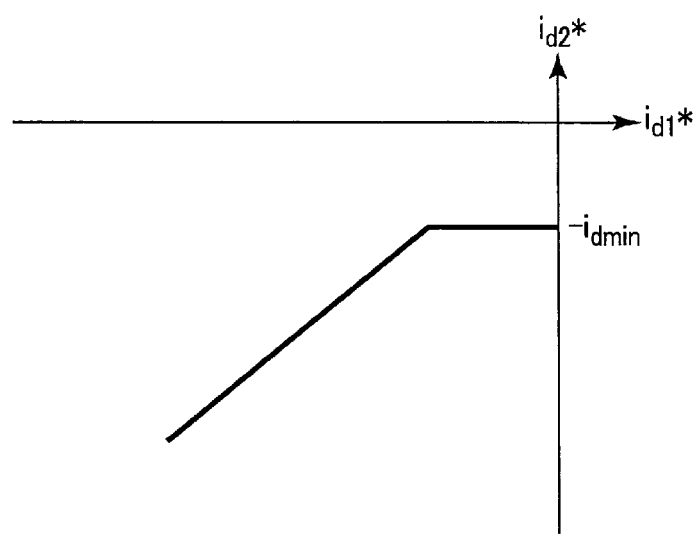
F I G. 8

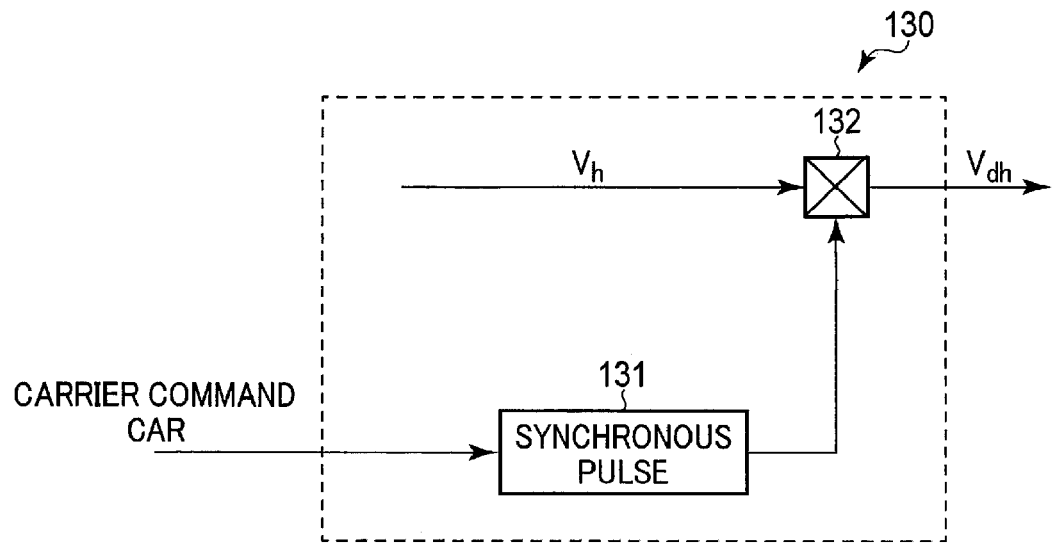
F I G. 9
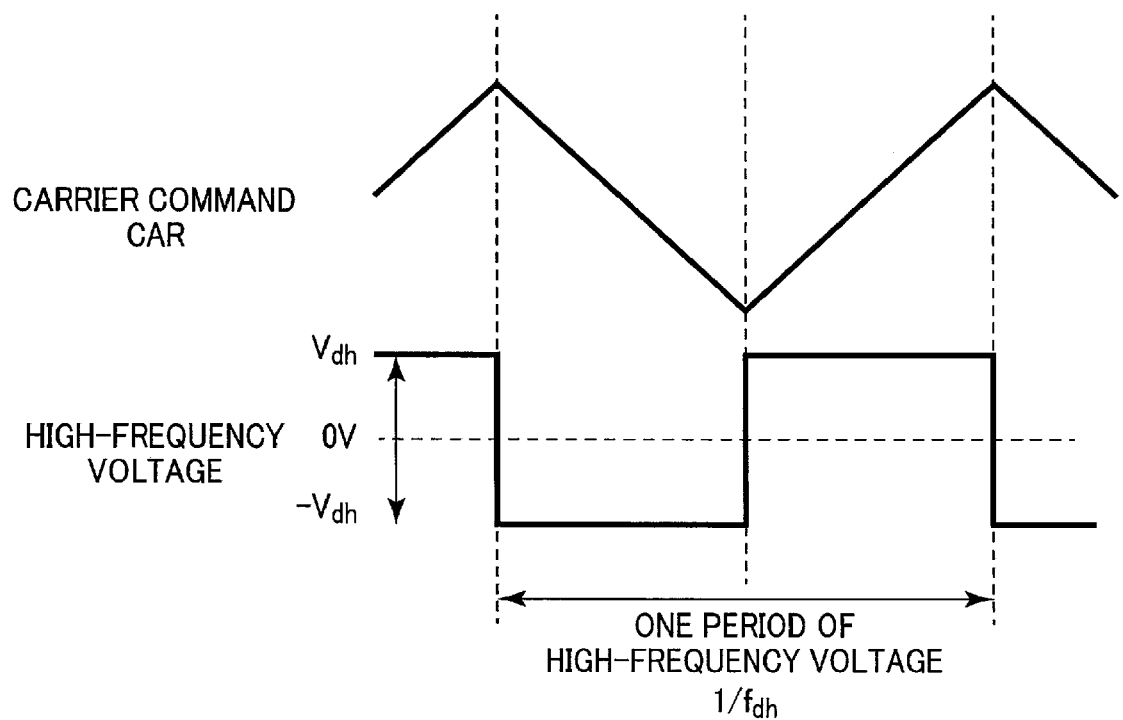
F I G. 10

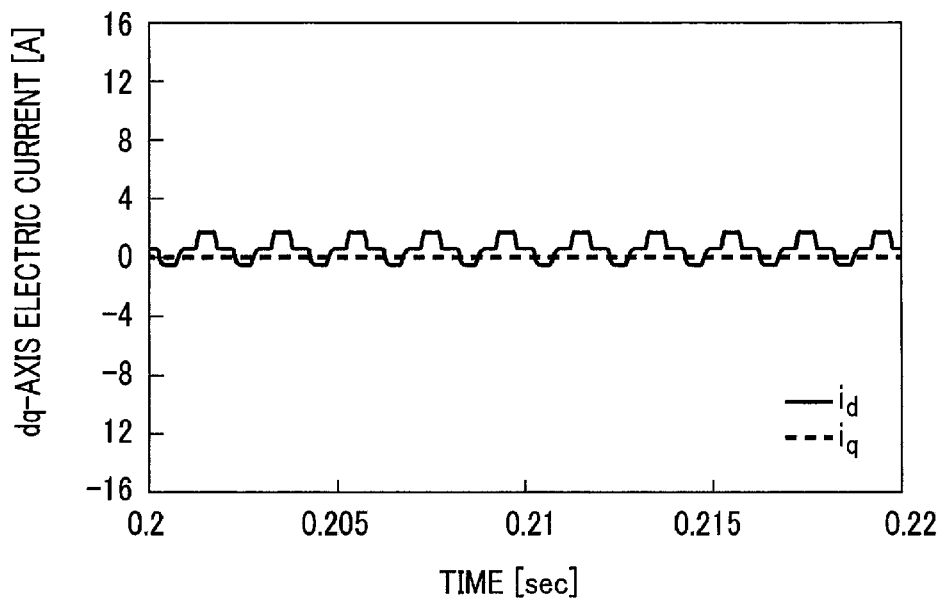
F I G. 13A
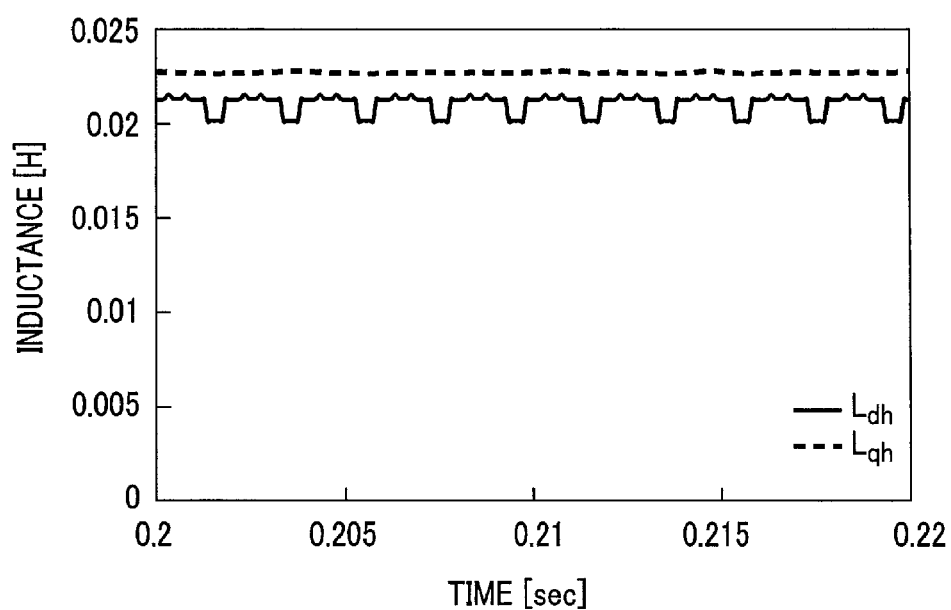
F I G. 13B

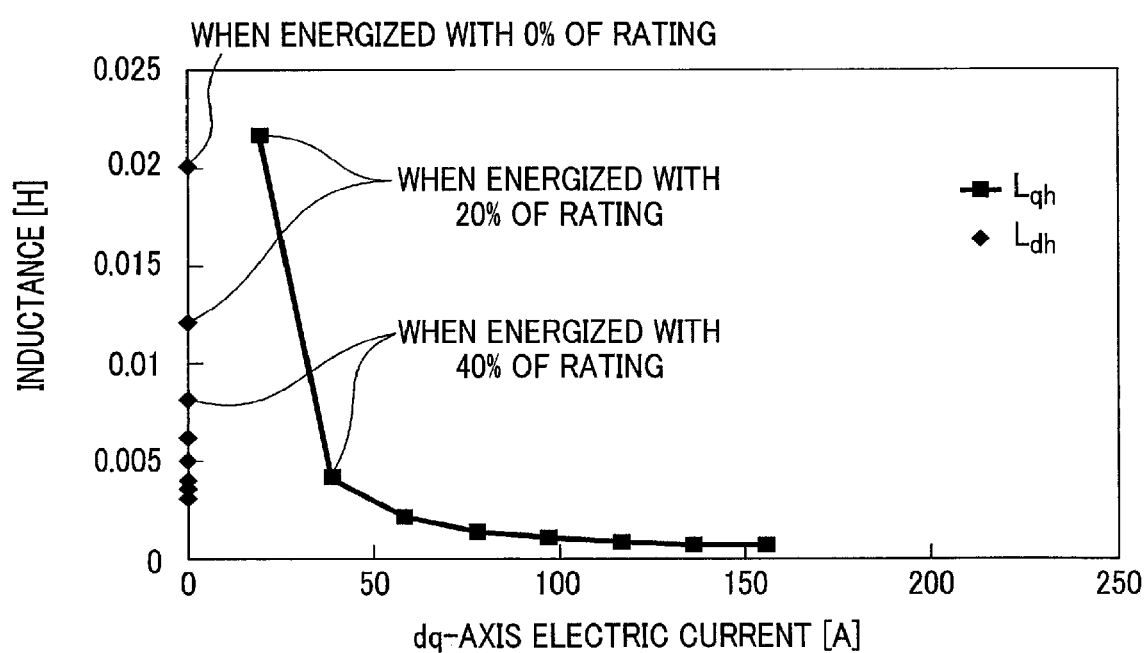
F I G. 15

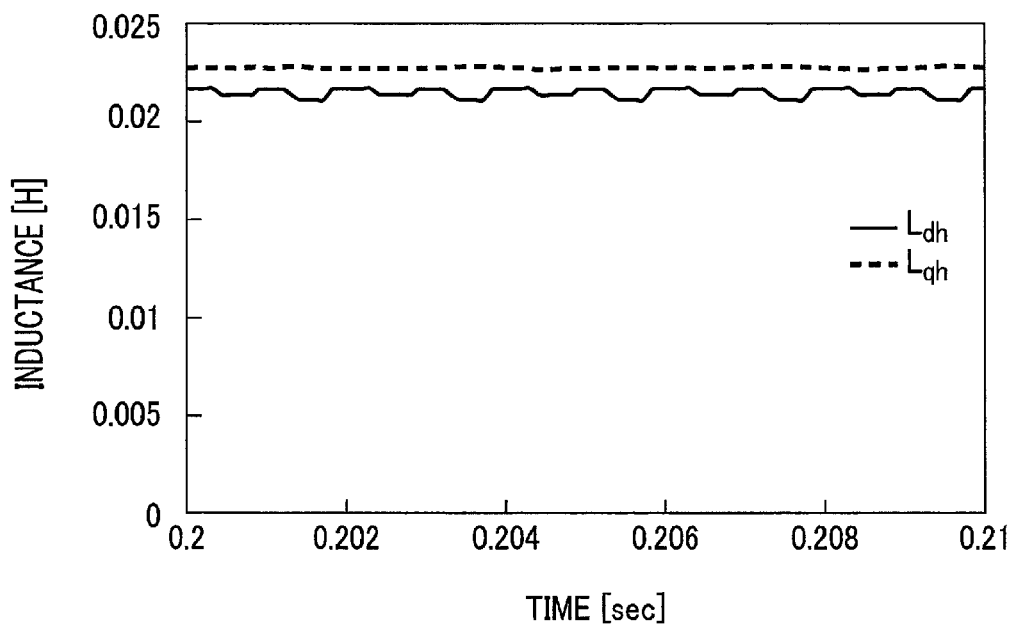
F I G. 16
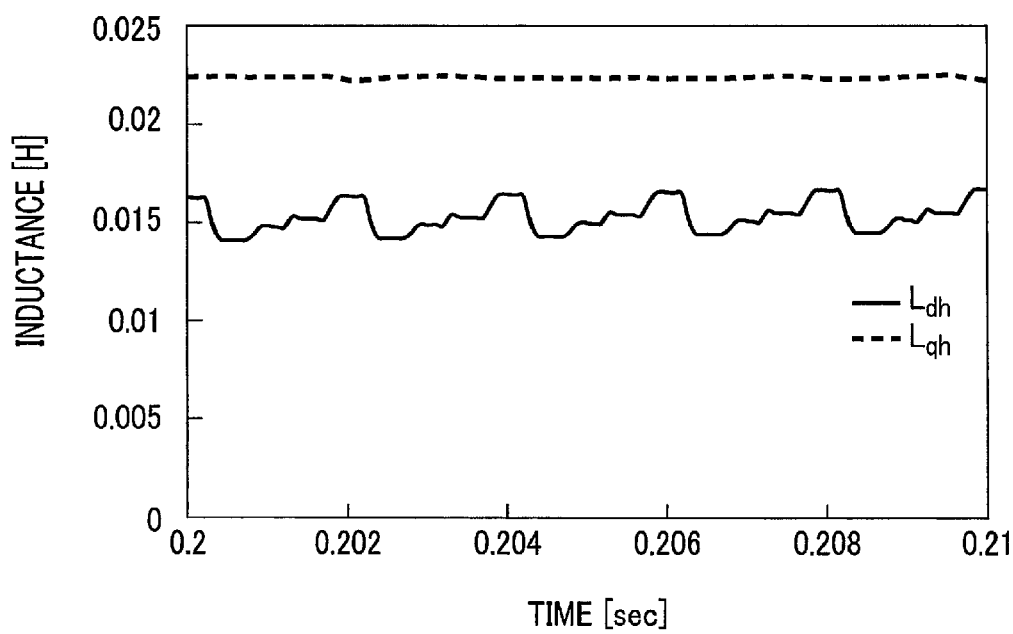
F I G. 17

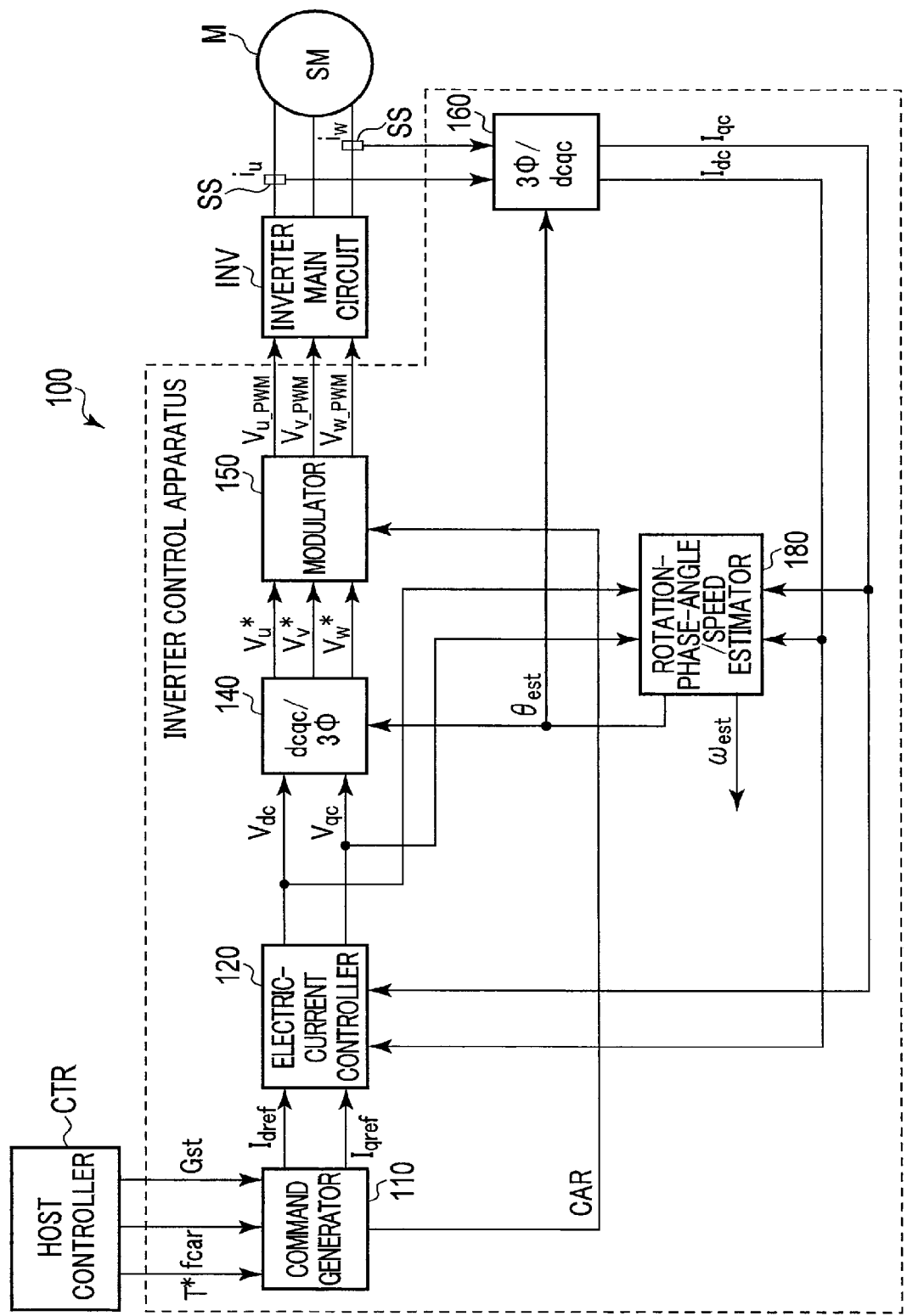
F I G. 18

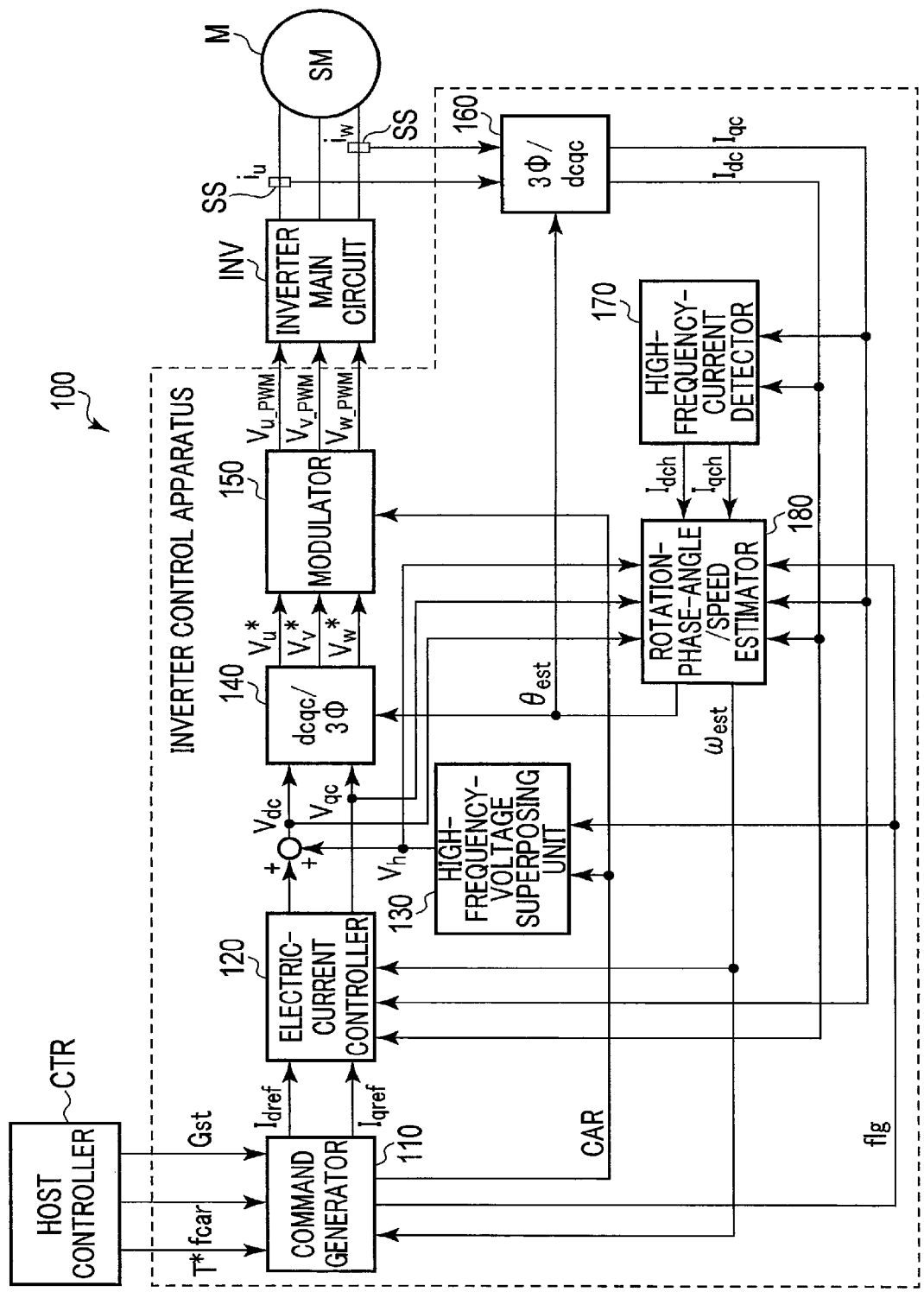
F I G. 20

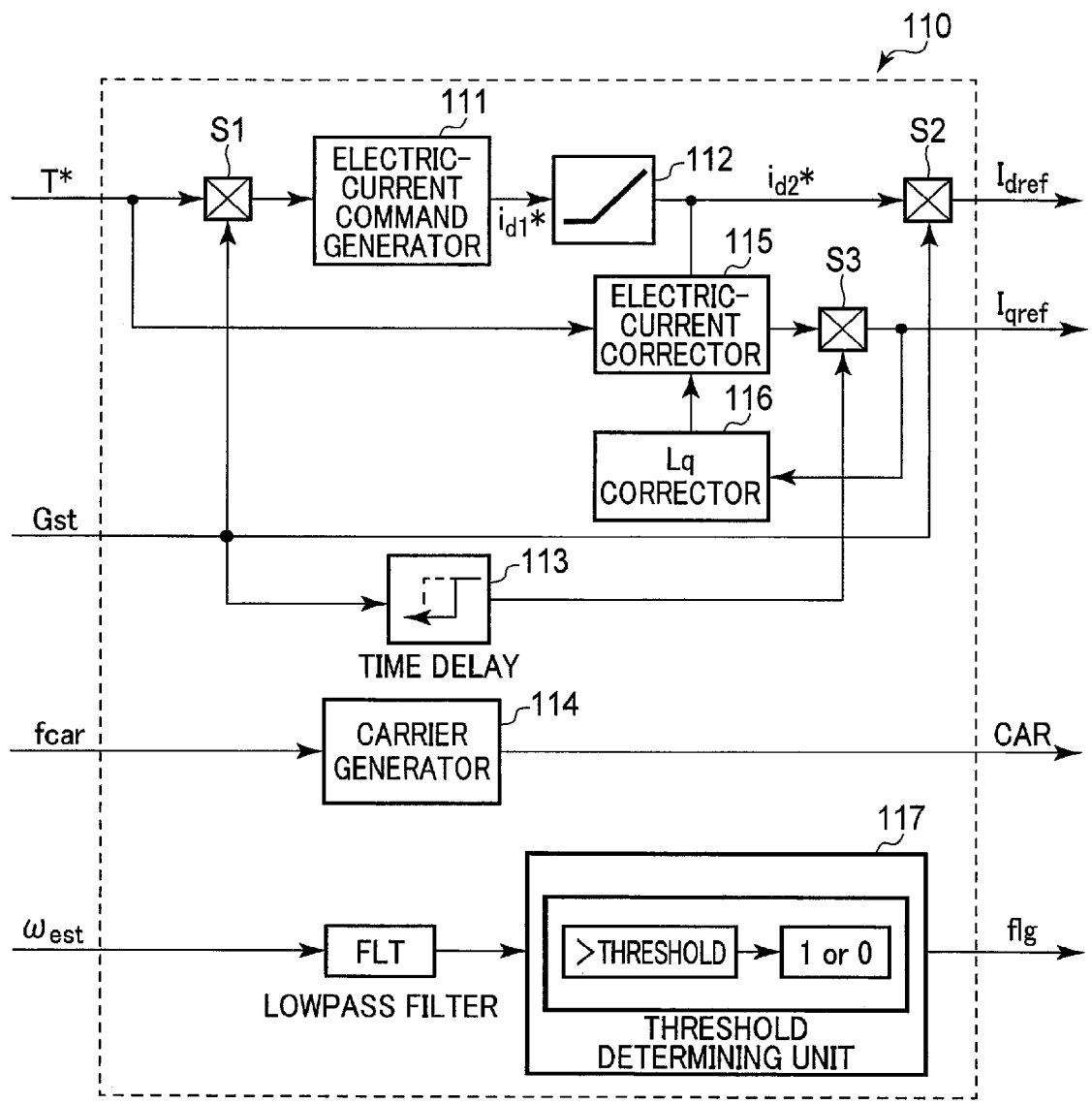
F I G. 21
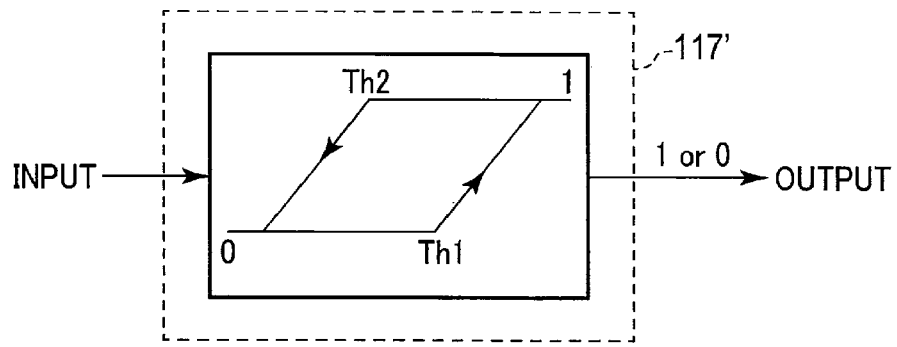
F I G. 22

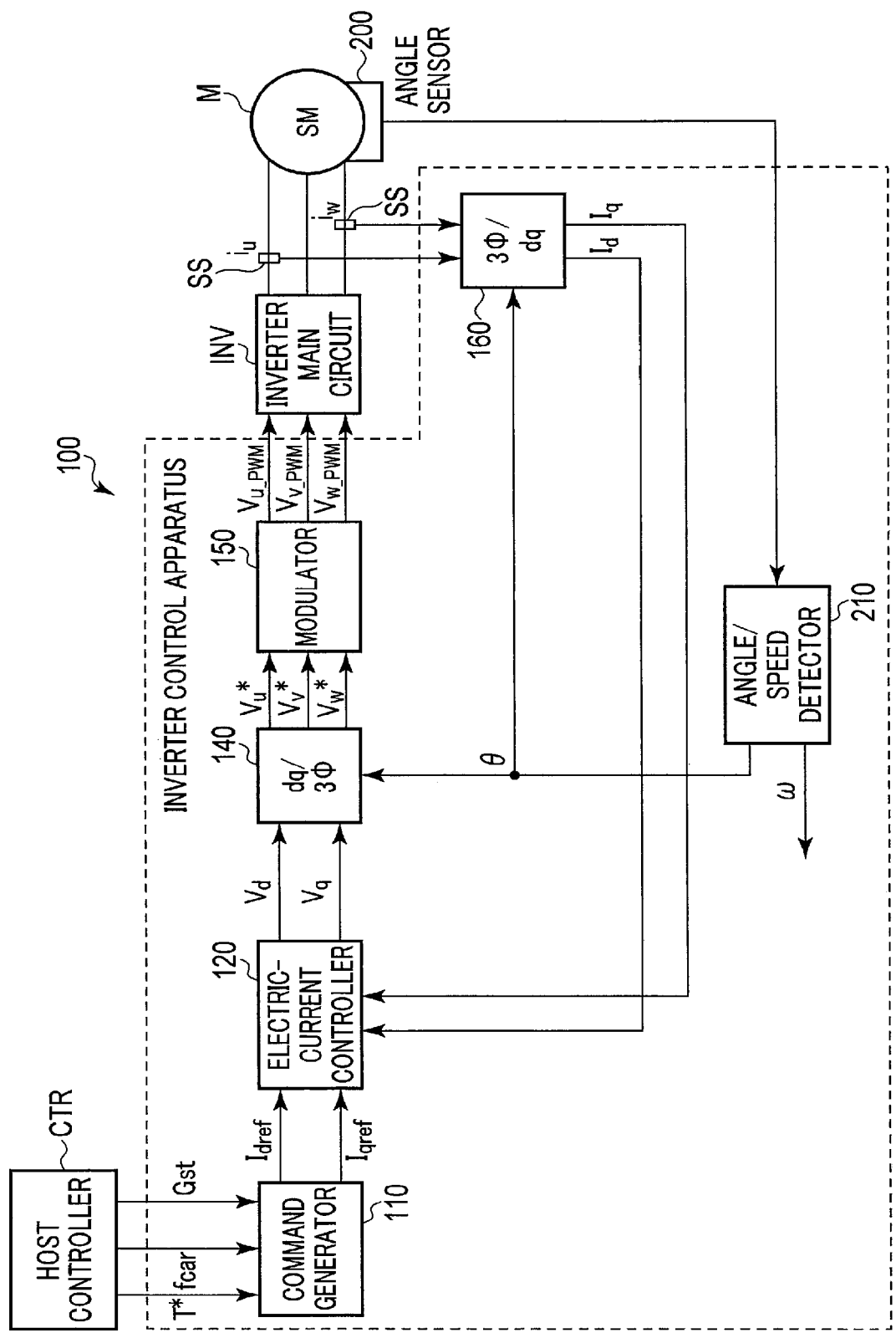
F I G. 25

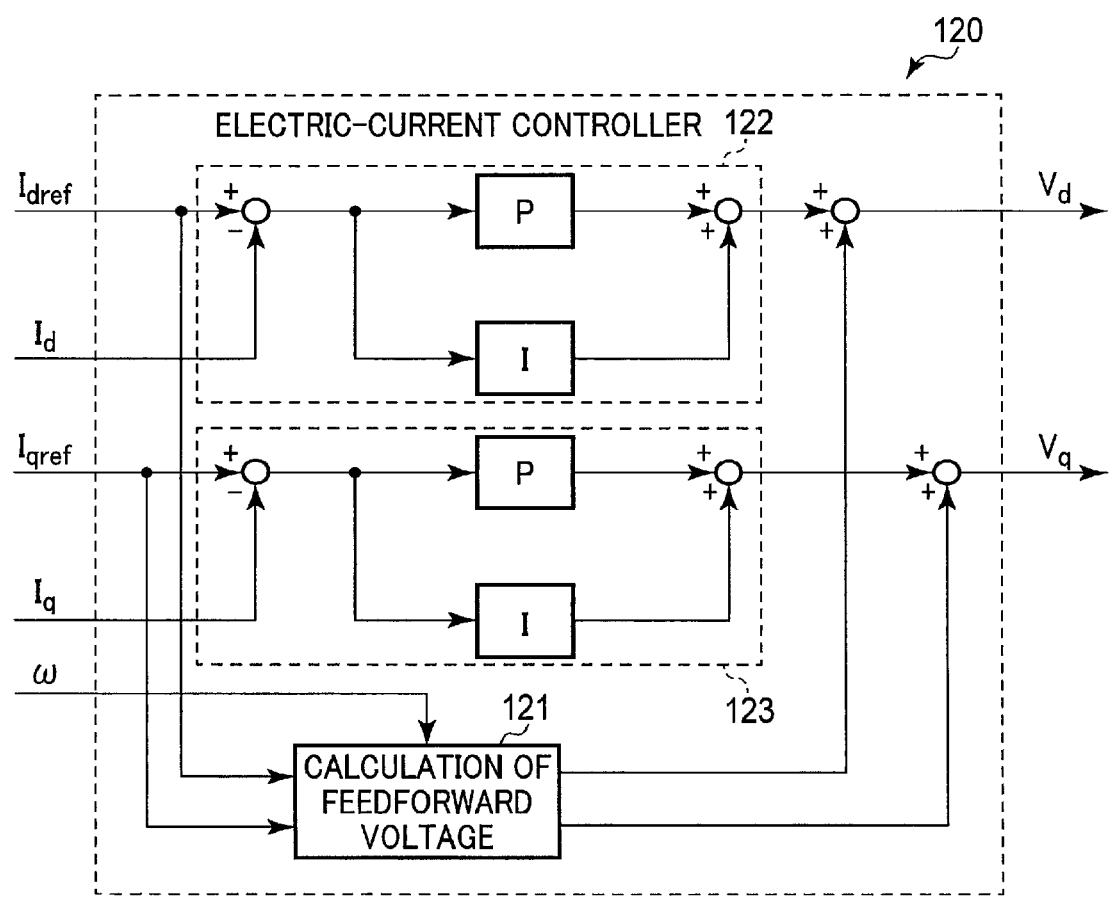
F I G. 26

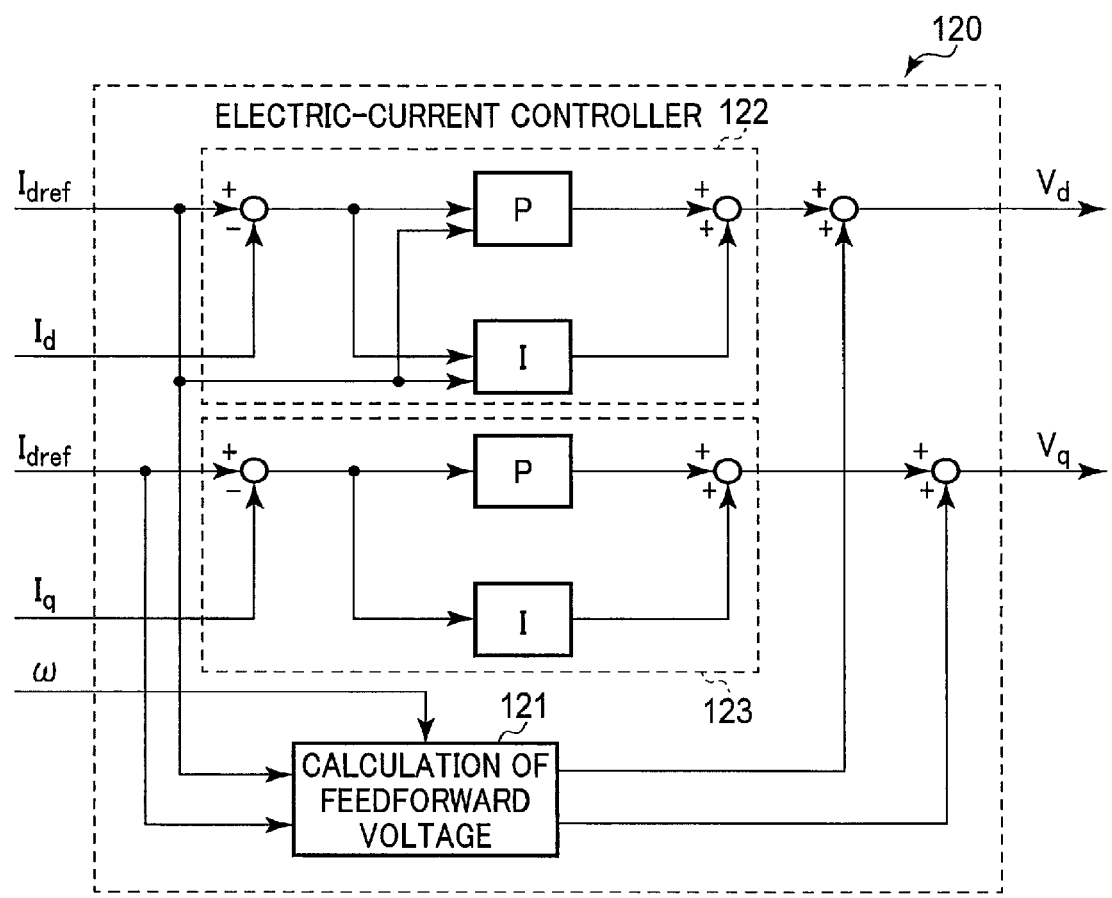
F I G. 27

INVERTER CONTROL APPARATUS AND MOTOR DRIVE SYSTEM

CROSS REFERENCE TO RELATED APPLICATIONS

This application is a Continuation Application of PCT Application No. PCT/JP2017/030980, filed Aug. 29, 2017 and based upon and claiming the benefit of priority from Japanese Patent Application No. 2016-173087, filed Sep. 5, 2016, the entire contents of all of which are incorporated herein by reference.

FIELD

Embodiments of the present invention relate to an inverter control apparatus and a motor drive system.

BACKGROUND

In a control apparatus for an inverter which drives a synchronous motor, it is desired to supply an electric current as designed and control output torque of a motor accurately.

Also, with a view to reducing a size and a weight of a control apparatus, reducing a cost, and improving reliability, a rotation-sensor-less control method in which a rotation sensor such as a resolver or an encoder is not used is proposed. In rotation-sensor-less control, it is desired that a rotation phase angle and a rotation speed can be estimated in a wide speed range from a stop of an inverter to the maximum speed.

However, when an inductance of a motor quickly changes, a time constant of a motor quickly changes, so that accuracy of control of an electric current was reduced in some cases. For example, in driving a salient-pole synchronous motor in which an inductance may quickly change because a rotor bridge unit is magnetically saturated with small amounts of electric currents, sensor-less control became unstable at a low-speed rotating time of a motor while accuracy of sensor-less control was reduced at a high-speed rotating time of a motor in some cases.

BRIEF DESCRIPTION OF THE DRAWINGS

FIG. 1 is a block diagram schematically showing a configuration example of an inverter control apparatus and a motor drive system according to a first embodiment.

FIG. 6 is a block diagram schematically showing a configuration example of a command generator shown in FIG. 1.

FIG. 7 is a view for explaining an example of operations of a lower-limit setting unit shown in FIG. 6.

FIG. 8 is a view for explaining an example of operations of a limiting unit shown in FIG. 6.

FIG. 9 is a block diagram schematically showing a configuration example of a high-frequency-voltage superposing unit shown in FIG. 1.

FIG. 10 is a view for explaining an example of a relationship between an input and an output of the high-frequency-voltage superposing unit shown in FIG. 1.

FIG. 13A is a view showing examples of a d-axis electric current and a q-axis electric current in a case where an electric current flowing through a synchronous motor is equal to approximately zero.

FIG. 13B is a view showing examples of a d-axis dynamic inductance and a q-axis dynamic inductance in a case where an electric current flowing through a synchronous motor is equal to approximately zero.

FIG. 15 is a view showing an example of dynamic inductance characteristics in a case where a phase-angle error estimation value is 90°.

FIG. 16 is a view showing examples of a d-axis dynamic inductance and a q-axis dynamic inductance in a case where a rotation-phase-angle error estimation value is equal to 90° and an electric current flowing through a synchronous motor is equal to approximately zero.

FIG. 17 is a view showing examples of a d-axis dynamic inductance and a q-axis dynamic inductance in a case where a rotation-phase-angle error estimation value is equal to 90° and an electric current is supplied to a synchronous motor toward a dc-axis.

FIG. 18 is a block diagram schematically showing a configuration example of an inverter control apparatus and a motor drive system according to a second embodiment.

FIG. 20 is a block diagram schematically showing a configuration example of an inverter control apparatus and a motor drive system according to a third embodiment.

FIG. 21 is a block diagram schematically showing a configuration example of a command generator shown in FIG. 20.

FIG. 22 is a view for explaining another configuration example of a threshold determining unit shown in FIG. 21.

FIG. 25 is a block diagram schematically showing a configuration example of an inverter control apparatus and a motor drive system according to a fourth embodiment.

FIG. 26 is a block diagram schematically showing a configuration example of an electric-current controller shown in FIG. 25.

FIG. 27 is a block diagram schematically showing a comparative example of an electric-current controller.

DETAILED DESCRIPTION

Figure 2:
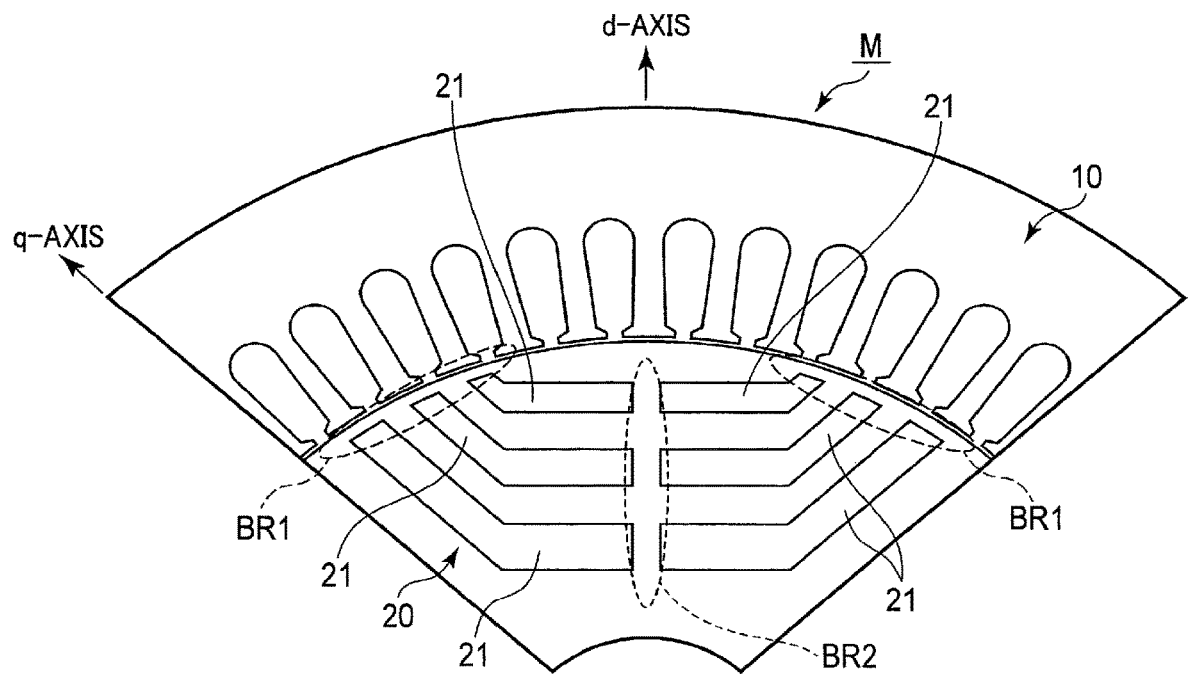
FIG. 2 is a view for explaining a configuration example of a part of a synchronous motor shown in FIG. 1.

An inverter control apparatus according to an embodiment comprises an inverter main circuit that drives a synchronous motor; an electric-current detector that detects an electric current flowing between the inverter main circuit and the synchronous motor; a command generator that generates an electric-current command value of an output electric current that is output from the inverter main circuit to the synchronous motor, in accordance with a torque command that is supplied externally; and an electric-current controller that generates a voltage command value for the inverter main circuit so that the electric-current command value and a detected electric-current value detected in the electric-current detector are equal to each other. The command generator generates the electric-current command value so that a fundamental wave current that is equal to or greater than a threshold is supplied to the synchronous motor, in driving the inverter main circuit.

Hereinafter, an inverter control apparatus and a motor drive system according to a first embodiment will be described with reference to the drawings.

FIG. 1 is a block diagram schematically showing a configuration example of an inverter control apparatus and a motor drive system according to the first embodiment.

The motor drive system according to the present embodiment includes a synchronous motor M, an inverter main circuit INV, an inverter control apparatus 100, and a host controller CTR. The inverter control apparatus 100 includes an electric-current detector SS, a command generator 110, an electric-current controller 120, a high-frequency-voltage superposing unit 130, coordinate converters 140 and 160, a modulator 150, a high-frequency-current detector 170, a rotation-phase-angle/speed estimator (first rotation-phase-angle/speed estimator) 180, and an adder 190.

The synchronous motor M is a synchronous motor including a rotor which is magnetically salient, and is a synchronous reluctance motor, for example. Also, as the synchronous motor M, a permanent-magnet synchronous motor using a magnet, a wound-field synchronous motor which supplies magnetic flux of a field using a secondary winding, or the like can be also employed. In the present embodiment, an example in which a synchronous reluctance motor is employed as the synchronous motor M will be described.

The inverter main circuit INV includes a direct-current power source (direct-current load) and two switching elements for each of a U-phase, a V-phase, and a W-phase. The two switching elements for each phase are connected in series between a direct-current line which is connected to a positive pole of the direct-current power source, and a direct-current line which is connected to a negative pole of the direct-current power source. Operations of the switching elements of the inverter main circuit INV are controlled by a gate command output from the modulator 150. The inverter main circuit INV is a three-phase alternating-current inverter which outputs a U-phase electric current $I_u$, a V-phase electric current $I_v$, and a W-phase electric current $I_w$ at a predetermined frequency, to the synchronous motor M which is an alternating-current load, in accordance with a gate command. Also, the inverter main circuit INV can charge a secondary battery which is a direct-current power source, with electric power generated in the synchronous motor M.

FIG. 2 is a view for explaining a configuration example of a part of the synchronous motor shown in FIG. 1.

It is noted that only a part of the synchronous motor M is shown here, and a stator 10 and a rotor 20 of the synchronous motor M are formed of a combination of a plurality of elements shown in FIG. 2, for example.

The synchronous motor M is a synchronous reluctance motor which is magnetically salient. The synchronous motor M includes the stator 10 and the rotor 20. The rotor 20 includes air gaps 21, an outer circumference bridge BR1, and a center bridge BR2.

The center bridge BR2 is placed on a line connecting a circumference and a center of the rotor 20. It is noted that the line on which the center bridge BR2 is placed is a d-axis. The outer circumference bridge BR1 is placed between a circumference of the rotor 20 and the air gaps 21. In the part of the synchronous motor M shown in FIG. 2, six air gaps 21 each extending from a circumferential portion to a central portion of the rotor 20 are provided. The air gaps 21 extend between the center bridge BR2 and the outer circumference bridge BR1 in such a manner that they are line-symmetric with respect to a d-axis.

Figure 3:
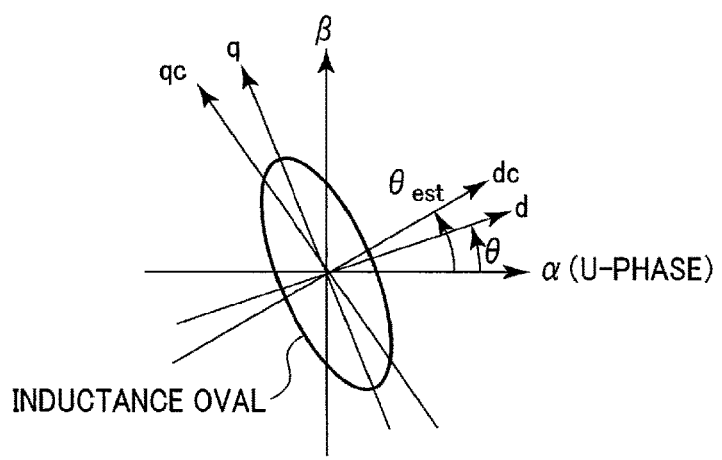
FIG. 3 is a view for explaining definitions of a d-axis, a q-axis, and an estimated rotation coordinate system (a dc-axis, a qc-axis) in embodiments.

FIG. 3 is a view for explaining definitions of a d-axis, a q-axis, and an estimated rotation coordinate system (a dc-axis, a qc-axis) in the embodiments.

A d-axis is a vector axis which rotates through a rotation phase angle θ with respect to a a-axis (U-phase) of a αβ fixed coordinate system, and a q-axis is a vector axis which is orthogonal to a d-axis at an electric angle. Also, in the present embodiment, the synchronous motor M is magnetically salient, a d-axis is a vector axis on which a static inductance becomes the lowest in the rotor 20 of the synchronous motor M, and a q-axis is a vector axis on which a static inductance becomes the highest in the rotor 20 of the synchronous motor M.

In contrast thereto, a dcqc estimated rotation coordinate system corresponds to a d-axis and a q-axis in an estimated position of the rotor 20. Specifically, a dc-axis is a vector axis which rotates through an angle of a rotation-phase-angle estimation value $\theta_{est}$ with respect to a α-axis, and a qc-axis is a vector axis which is orthogonal to a dc-axis at an electric angle. In other words, a dc-axis is a vector axis which rotates through an angle of an estimated error Δθ with respect to a d-axis, and a qc-axis is a vector axis which rotates through an angle of the estimated error Δθ with respect to a q-axis.

Below, an example of characteristics of a static inductance and a dynamic inductance regarding the above-described synchronous motor M will be described.

Figure 4:
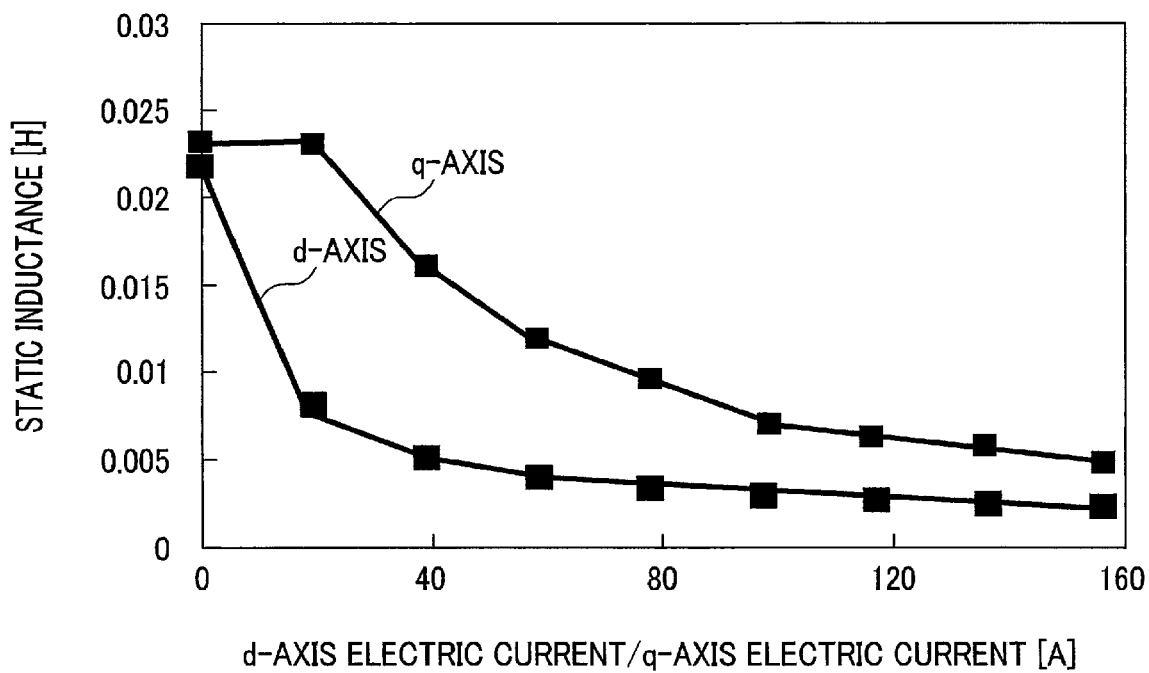
FIG. 4 is a view showing examples of a q-axis static inductance and a d-axis static inductance in a case where an electric motor is energized.

FIG. 4 is a view showing examples of a q-axis static inductance and a d-axis static inductance in a case where an electric motor is energized.

Figure 5:
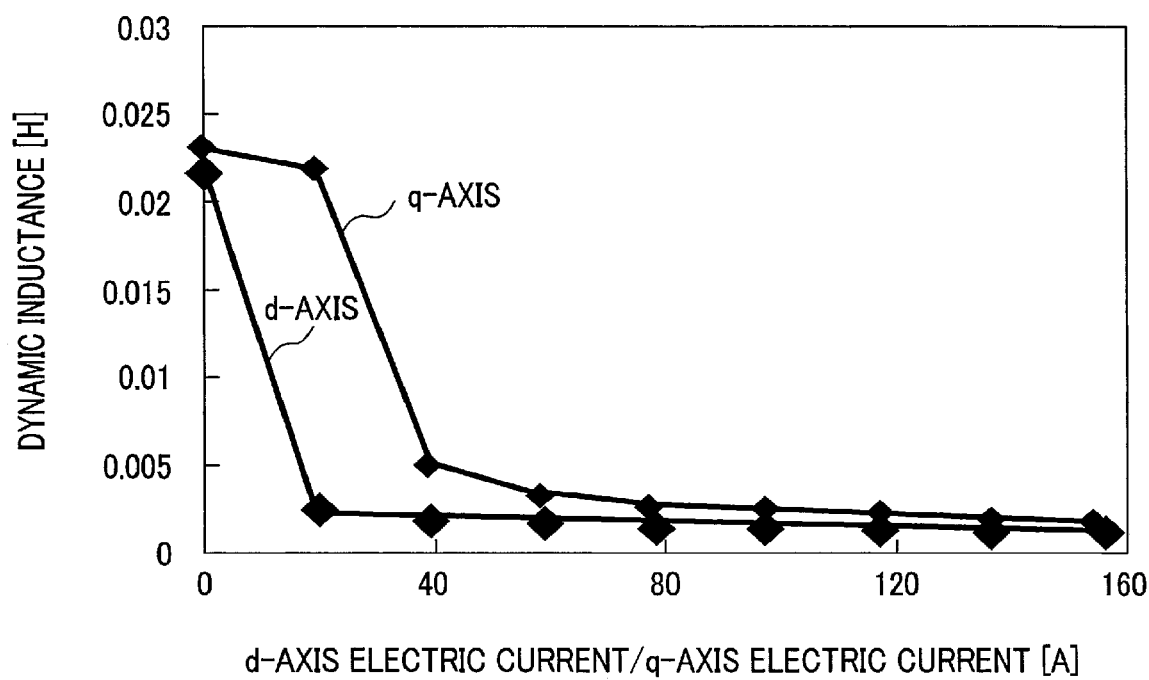
FIG. 5 is a view showing examples of a q-axis dynamic inductance and a d-axis dynamic inductance in a case where an electric motor is energized.

FIG. 5 is a view showing examples of a q-axis dynamic inductance and a d-axis dynamic inductance in a case where an electric motor is energized.

A static inductance is an inductance related to a fundamental wave current flowing through the synchronous motor M, and a dynamic inductance is an inductance related to a harmonic current flowing through the synchronous motor M. A static inductance corresponds to an amount of change (φ/I) of magnetic flux φ which is produced by a certain fundamental-wave-current value (I). A dynamic inductance corresponds to an amount of change (Δφ/ΔI) of fluctuation Δφ of magnetic flux related to fluctuation ΔI of a certain harmonic current.

When a static inductance and a dynamic inductance are compared, a dynamic inductance is equal to or lower than a static inductance. This is because a dynamic inductance is correlated with magnetic saturation of the bridges BR1 and BR2 of the rotor 20 and a static inductance is correlated with magnetic saturation of an electromagnetic steel plate through which main magnetic flux passes. Specifically, it indicates that magnetic saturation occurs earlier in the bridges BR1 and BR2 of the rotor 20 when an electric current is supplied to the synchronous motor M.

Also, each of a d-axis dynamic inductance and a q-axis dynamic inductance tends to converge on a predetermined value as magnetic saturation proceeds. The inverter control apparatus and the motor drive system according to the present embodiment control an electric current and estimate a magnetic pole based on the above-described characteristics of the synchronous motor M.

The electric-current detector SS detects alternating-current values of at least two phases out of three-phase alternating currents (response currents) $i_u$, $i_v$, and $i_w$ which flow to the synchronous motor M, and supplies them to the inverter control apparatus 100.

The coordinate converter 160 is a vector transformation unit which converts the response current values $i_u$ and $i_w$ which are supplied from the electric-current detector SS and appear in a three-phase fixed coordinate system into response current values $I_{dc}$ and $I_{qc}$ in a dcqc estimated rotation coordinate system using a phase-angle estimation value $\theta_{est}$ supplied from the rotation-phase-angle/speed estimator 180. The coordinate converter 160 supplies the dc-axis electric-current value $I_{dc}$ and the qc-axis electric-current value $I_{qc}$ to the electric-current controller 120.

The command generator 110 receives a torque command T* and an ON/OFF command Gst from the host controller CTR, and generates and outputs a d-axis electric-current command $I_{dref}$ and a q-axis electric-current command $I_{qref}$. Also, the command generator 110 receives a carrier frequency fcar from the host controller CTR and outputs a carrier command CAR. Further, the command generator 110 sets an upper limit to an amplitude of the d-axis electric-current command value $I_{dref}$.

FIG. 6 is a block diagram schematically showing a configuration example of the command generator shown in FIG. 1.

The command generator 110 includes an electric-current command generator 111, a limiting unit 112, a time delay unit 113, a carrier generator 114, an electric-current corrector 115, and an $L_q$ corrector 116.

The electric-current command generator 111 calculates a dq-axis electric-current command value which minimizes copper loss, using a map, approximation, a theoretical relation, or the like, for example. The electric-current command generator 111 outputs one of calculated dq-axis electric-current command values, as a first d-axis electric-current command $i_{d1}*$.

In the present embodiment, by the first d-axis electric-current command $i_{d1}*$, a fundamental wave current of a magnitude which is equal to or greater than a predetermined threshold is supplied in a −d-axis relative to the rotor 20 of the synchronous motor M.

The limiting unit 112 calculates an absolute value of a second d-axis electric-current command $i_{d2}*$ while setting an absolute value of the first d-axis electric-current command $i_{d1}*$ to be equal to or lower than a lower limit $i_{dlim}$, and calculates and outputs the second d-axis electric-current command $i_{d2}*$ so that a sign of the second d-axis electric-current command $i_{d2}*$ is identical to a sign of the first d-axis electric-current command $i_{d1}*$.

The limiting unit 112 includes an absolute-value calculator ABS, a lower-limit setting unit LIM, a sign determining unit 112A, and a multiplier 112B.

The absolute-value calculator ABS receives the first d-axis electric-current command $i_{d1}*$ from the electric-current command generator 111, and calculates and outputs an absolute value of the first d-axis electric-current command $i_{d1}*$.

FIG. 7 is a view for explaining an example of operations of the lower-limit setting unit shown in FIG. 6.

The lower-limit setting unit LIM receives an absolute value of the first d-axis electric-current command $i_{d1}*$ from the absolute-value calculator ABS, and outputs an absolute value of the second d-axis electric-current command $i_{d2}*$ which is equal to an absolute value of the first d-axis electric-current command $i_{d1}*$ when an absolute value of the first d-axis electric-current command $i_{d1}*$ is equal to or greater than the lower limit $i_{dlim}$. On the other hand, the lower-limit setting unit LIM outputs an absolute value of the second d-axis electric-current command $i_{d2}*$ which is equal to the lower limit $i_{dlim}$ when an absolute value of the first d-axis electric-current command $i_{d1}*$ is smaller than the lower limit $i_{dlim}$.

The sign determining unit 112A receives the first d-axis electric-current command $i_{d1}*$ from the electric-current command generator 111, and determines whether the first d-axis electric-current command $i_{d1}*$ is greater than zero, or equal to or smaller than zero. The sign determining unit 112A outputs "+1" when the first d-axis electric-current command $i_{d1}*$ is greater than zero, and outputs "−1" when the first d-axis electric-current command $i_{d1}*$ is equal to or smaller than zero.

The multiplier 112B multiplies an absolute value of the second d-axis electric-current command $i_{d2}*$ output from the lower-limit setting unit LIM and an output value of the sign determining unit 112A, and outputs its result.

FIG. 8 is a view for explaining an example of operations of the limiting unit shown in FIG. 6.

For example, when the first d-axis electric-current command $i_{d1}*$ is negative, the limiting unit 112 sets a lower limit to an amplitude of a d-axis electric current and outputs the second d-axis electric-current command $i_{d2}*$ as shown in FIG. 8.

As described above, by setting a lower limit to an amplitude of a d-axis electric current, it is possible to supply a fundamental wave current which is equal to or greater than a predetermined threshold, to the synchronous motor M in a d-axis direction (or in a −d-axis direction).

The electric-current corrector 115 receives the second d-axis electric-current command $i_{d2}*$ from the limiting unit 112, and calculates a q-axis electric-current command $i_q*$ using the following [Expression A].

[Mathematical 1]

$$i_q^* = \frac{T^*}{p(L_d - L_q)i_{d2}^*}$$ [Expression A]

It is noted that $L_d$ represents a d-axis inductance, p represents the number of pole pairs, $L_q$ represents a q-axis inductance (which is a value corrected by the $L_q$ corrector 116).

The $L_q$ (q-axis inductance) corrector 116 receives the q-axis electric-current command $I_{qref}$ calculated in the electric-current corrector 115, calculates the q-axis inductance $L_q$ using a map or approximation, and outputs its result to the electric-current corrector 115.

When the q-axis electric-current command $i_q^*$ (=the q-axis electric-current command $I_{qref}$) is calculated by the foregoing [Expression A], the q-axis electric-current command $I_{qref}$ is a value based on the torque command T* and a second d-axis electric-current command $i_{d2}^*$, to be a direct-current value.

The time delay unit 113 outputs the ON/OFF command Gst while delaying the ON/OFF command Gst by a predetermined time.

It is noted that the ON/OFF command Gst is a control command for a logical-AND operation unit S1 which changes electrical connection of a path over which a torque command is supplied to the electric-current command generator 111, and a logical-AND operation unit S2 which changes electrical connection of a path over which the second d-axis electric-current command $i_{d2}^*$ is output as the d-axis electric-current command $I_{dref}$ from the limiting unit 112. Also, the ON/OFF command Gst is supplied to a logical-AND operation unit S3 which changes electrical connection of a path over which a q-axis electric-current command is output from the electric-current corrector 115 via the time delay unit 113. Accordingly, the q-axis electric-current command $I_{qref}$ is output while being delayed with respect to the d-axis electric-current command $I_{dref}$ by at least a time required for calculations in the $L_q$ corrector 116 and the electric-current corrector 115.

In the present embodiment, the above-described electric-current corrector 115 allows the electric-current command values $I_{dref}$ and $I_{qref}$ which are output from the electric-current command generator 111 to serve as electric-current command values which generate torque in accordance with the torque command T* in the synchronous motor M. Accordingly, even if a lower limit to an electric-current command value is set by the limiting unit 112, torque as is expected is output, so that a speed control system can be prevented from becoming unstable.

Additionally, though an example in which an upper limit to an amplitude of the d-axis electric-current command $I_{dref}$ is set has been described in the present embodiment, also in a case where an upper limit to an amplitude of the q-axis electric-current command $I_{qref}$ is set, it is possible to produce the same effects as produced in the present embodiment by calculating the d-axis electric-current command from the torque command T*.

The carrier generator 114 generates and outputs the carrier command CAR used in the modulator 150, based on the carrier frequency fcar which is supplied externally. In the present embodiment, a carrier command is a triangular wave at a predetermined frequency.

The electric-current controller 120 includes a PI (proportional-plus-integral) controller, for example. The electric-current controller 120 compares the dc-axis electric-current value $I_{dc}$ and the qc-axis electric-current value $I_{qc}$ which are supplied from the coordinate converter 160, with the d-axis electric-current command $I_{dref}$ and the q-axis electric-current command $I_{qref}$, and calculates and outputs voltage commands $V_{dc}$ and $V_{qc}$ so that the dc-axis electric-current value $I_{dc}$ and the d-axis electric-current command $I_{dref}$ are equal to zero and a difference between the qc-axis electric-current value $I_{qc}$ and the q-axis electric-current command $I_{qref}$ is equal to zero.

The high-frequency-voltage superposing unit 130 receives the carrier command CAR from the command generator 110, generates a high-frequency voltage at an arbitrary frequency for a dc-axis, a qc-axis, or both of those axes, and outputs its result to the adder 190 and the rotation-phase-angle/speed estimator 180. In the present embodiment, the high-frequency-voltage superposing unit 130 outputs a dc-axis high-frequency voltage $V_{dh}$.

FIG. 9 is a block diagram schematically showing a configuration example of the high-frequency-voltage superposing unit shown in FIG. 1.

FIG. 10 is a view for explaining an example of a relationship between an input and an output of the high-frequency-voltage superposing unit shown in FIG. 1.

The high-frequency-voltage superposing unit 130 includes a synchronous-pulse generator 131 and a high-frequency-voltage synchronization unit (logical-AND operation unit) 132.

The synchronous-pulse generator 131 generates a synchronous pulse which is synchronous with the carrier command CAR supplied from the command generator 110, and outputs it to the high-frequency-voltage synchronization unit 132.

The high-frequency-voltage synchronization unit 132 combines a voltage $V_h$ which is an internally-generated direct-current-voltage command value of a predetermined magnitude, with a synchronous pulse, and outputs a resultant voltage. Specifically, the high-frequency voltage $V_{dh}$ output from the high-frequency-voltage superposing unit 130 is a high-frequency-voltage command which has a predetermined amplitude $V_h$ and a high-frequency voltage period ($1/f_{dh}$) which is synchronous with a period (1/fcar) of the carrier command CAR.

The adder 190, which is placed in a stage subsequent to the electric-current controller 120, updates the voltage command $V_{dc}$ output from the electric-current controller 120 by adding the high-frequency voltage $V_{dh}$ to the voltage command $V_{dc}$, and outputs its result.

The coordinate converter 140 is a vector transformation unit which converts the voltage commands $V_{dc}$ and $V_{qc}$ of the dcqc estimated rotation coordinate system into voltage commands $V_u^*$, $V_v^*$, and $V_w^*$ of the three-phase fixed coordinate system, using the phase-angle estimation value $\theta_{est}$ supplied from the rotation-phase-angle/speed estimator 180.

In the present embodiment, the voltage commands $V_{dc}$ and $V_{qc}$ supplied from the coordinate converter 140 have values based on the electric-current commands $I_{dref}$ and $I_{qref}$ by which a fundamental wave current of a predetermined magnitude is supplied to the synchronous motor M in a −d-axis direction. As a result of vector transformation of the voltage commands $V_{dc}$ and $V_{qc}$ using the phase-angle estimation value $\theta_{est}$, the voltage commands $V_u^*$, $V_v^*$, and $V_w^*$ which are synchronous with a rotor speed (=$\omega_{est}$) and a rotor frequency (=$\omega_{est}/2\pi$) can be obtained.

The modulator 150 generates gate commands $V_{u\_PWM}$, $V_{v\_PWM}$, and $V_{w\_PWM}$ by modulating the voltage commands $V_u^*$, $V_v^*$, and $V_w^*$ in accordance with the carrier command CAR, and outputs them to the inverter main circuit INV. In the present embodiment, the carrier command CAR is a triangular wave at a predetermined frequency, and the modulator 150 accomplishes PWM modulation control by comparing a triangular wave and a voltage command.

The switching elements of the inverter main circuit INV operate based on the gate commands $V_{u\_PWM}$, $V_{V\_PWM}$, and $V_{w\_PWM}$ output from the above-described modulator 150, so that a fundamental wave current which is synchronous with the rotor speed ($=\omega_{est}$) and the rotor frequency ($=\omega_{est}/2\pi$), has a magnitude equal to or greater than a predetermined threshold, and flows in a −d-axis direction, is supplied to the synchronous motor M.

Figure 11:
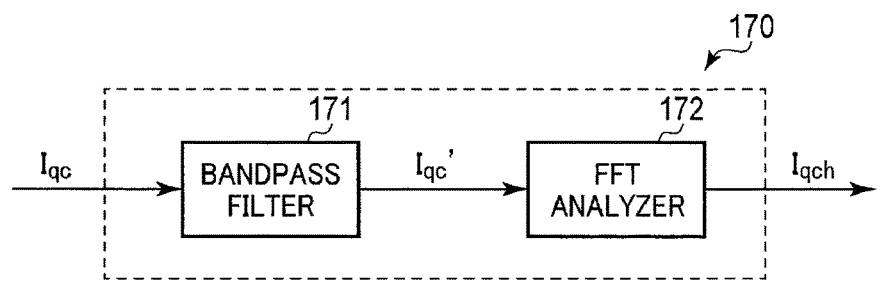
FIG. 11 is a block diagram schematically showing a configuration example of a high-frequency-current detector shown in FIG. 1.

FIG. 11 is a block diagram schematically showing a configuration example of a high-frequency-current detector shown in FIG. 1.

The high-frequency-current detector 170 includes a bandpass filter 171 and a FFT analyzer 172.

The bandpass filter 171 receives the dc-axis response current value (output electric current) $I_{dc}$ and the qc-axis response current value (output electric current) $I_{qc}$ from the coordinate converter 160, and extracts and outputs a high-frequency electric-current value $i_{qc}'$ at a frequency equal to a frequency $f_{dh}$ of the high-frequency voltage $V_{dh}$ which is superposed on the dc-axis voltage command $V_{dc}$ by the adder 190.

The FFT analyzer 172 carries out FFT analysis of the high-frequency electric-current value $i_{qc}'$, detects a high-frequency-current amplitude $I_{qch}$, and outputs it to the rotation-phase-angle/speed estimator 180, for example.

The rotation-phase-angle/speed estimator 180 calculates and outputs the rotation-phase-angle estimation value $\theta_{est}$ and the rotation-speed estimation value $\omega_{est}$ using the high-frequency-current amplitude $I_{qch}$ and the high-frequency voltage $V_{dh}$.

Below, respective elements of the inverter control apparatus 100 will be described in detail.

Figure 12:
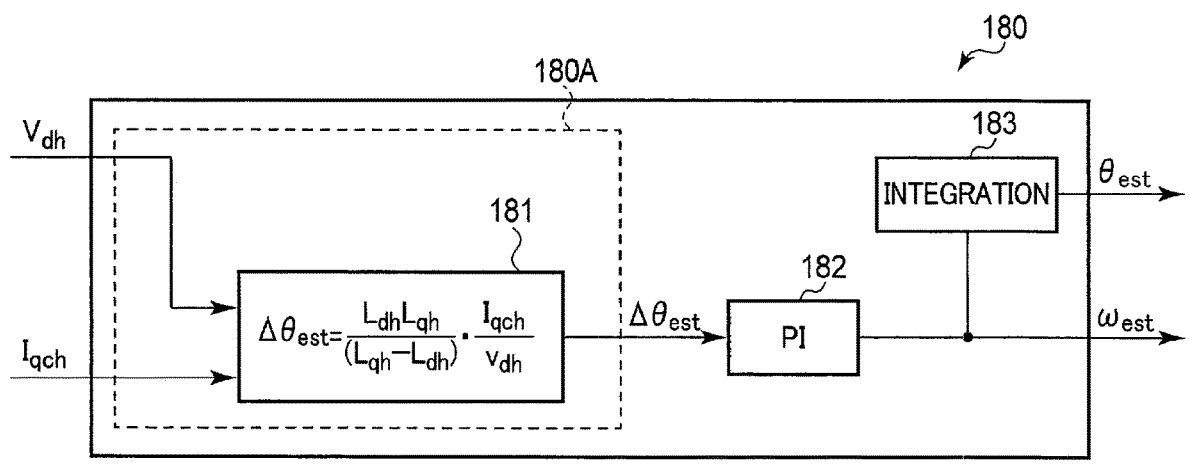
FIG. 12 is a block diagram schematically showing a configuration example of a rotation-phase-angle/speed estimator shown in FIG. 1.

FIG. 12 is a block diagram schematically showing a configuration example of the rotation-phase-angle/speed estimator shown in FIG. 1.

The rotation-phase-angle/speed estimator 180 includes a first phase-angle error estimator 180A including a rotation-phase-angle error calculator 181, a PI (proportional-plus-integral) controller 182, and an integrator 183.

For example, in a case where the rotation-phase-angle error $\Delta\theta$ is zero in the synchronous motor M (in a case where an actual dq-axis matches an estimated dcqc-axis), a voltage equation is expressed by the following [Expression 1].

[Mathematical 2]

$$\begin{bmatrix} v_d \\ v_q \end{bmatrix} = \begin{bmatrix} R + pL_d & -\omega_e L_q \\ \omega_e L_d & R + pL_q \end{bmatrix} \begin{bmatrix} i_d \\ i_q \end{bmatrix} \quad \text{[Expression 1]}$$

In the foregoing [Expression 1], $v_d$ represents a d-axis voltage, $v_q$ represents a q-axis voltage, $i_d$ represents a d-axis electric current, $i_q$ represents a q-axis electric current, R represents coil resistance of an armature, $\omega_e$ represents an angular velocity of an electrical angle, $L_d$ represents a d-axis inductance, $L_q$ represents a q-axis inductance, and p represents a differential operator ($=d/dt$).

In contrast to the voltage equation of [Expression 1] in a case where the rotation-phase-angle estimation value $\theta_{est}$ is equal to a true rotation phase angle $\theta$, in a case where the rotation-phase-angle estimation value $\theta_{est}$ is not equal to a true rotation phase angle $\theta$, a dcqc-axis voltage equation is rewritten as [Expression 2].

[Mathematical 3]

$$\begin{bmatrix} v_{dc} \\ v_{qc} \end{bmatrix} = \begin{bmatrix} R + pL_{dc} & -\omega_e L_{qc} \\ \omega_e L_{dc} & R + pL_{dqc} \end{bmatrix} \begin{bmatrix} i_{dc} \\ i_{qc} \end{bmatrix} + p \begin{bmatrix} L_{dc} & L_{dqc} \\ L_{dqc} & L_{qc} \end{bmatrix} \begin{bmatrix} i_{dc} \\ i_{qc} \end{bmatrix} \quad \text{[Expression 2]}$$

Where,
$L_{dc} = L_0 + L_1 \cos 2\Delta\theta$
$L_{qc} = L_0 - L_1 \cos 2\Delta\theta$
$L_{dqc} = L_1 \sin 2\Delta\theta$
$L_0 = \dfrac{(L_d + L_q)}{2}$
$L_1 = \dfrac{(L_d - L_q)}{2}$ Further, to reorganize the foregoing [Expression 2] for an electric-current differential term results in the following [Expression 3].

[Mathematical 4]

$$p\begin{bmatrix} i_{dc} \\ i_{qc} \end{bmatrix} = \frac{1}{L_d L_q}\begin{bmatrix} L_0 - L_1\cos 2\Delta\theta & -L_1\sin 2\Delta\theta \\ -L_1\sin 2\Delta\theta & L_0 + L_1\cos 2\Delta\theta \end{bmatrix} \times \left\{ \begin{bmatrix} v_{dc} \\ v_{qc} \end{bmatrix} - \begin{bmatrix} R & -\omega_e L_0 \\ \omega_e L_0 & R \end{bmatrix} \begin{bmatrix} i_{dc} \\ i_{qc} \end{bmatrix} - \begin{bmatrix} -\omega_e L_1 \sin 2\Delta\theta & \omega_e L_1 \cos 2\Delta\theta \\ \omega_e L_1 \cos 2\Delta\theta & \omega_e L_1 \sin 2\Delta\theta \end{bmatrix} \begin{bmatrix} i_{dc} \\ i_{qc} \end{bmatrix} \right\} \quad \text{[Expression 3]}$$

At this time, in a case where the number of revolutions of a motor is sufficiently low (i.e., at a low-speed rotating time) and voltage drop due to resistance is negligible, the foregoing [Expression 3] can be expressed as the following [Expression 4].

[Mathematical 5]

$$p\begin{bmatrix} i_{dc} \\ i_{qc} \end{bmatrix} = \frac{1}{L_d L_q}\begin{bmatrix} L_0 - L_1\cos 2\Delta\theta & -L_1\sin 2\Delta\theta \\ -L_1\sin 2\Delta\theta & L_0 + L_1\cos 2\Delta\theta \end{bmatrix}\begin{bmatrix} v_{dc} \\ v_{qc} \end{bmatrix} \quad \text{[Expression 4]}$$

Further, if a high-frequency voltage is applied to only a dc-axis, for example, the foregoing [Expression 4] can be expressed as the following [Expression 5].

[Mathematical 6]

$$p\begin{bmatrix} i_{dc} \\ i_{qc} \end{bmatrix} = \frac{1}{L_d L_q}\begin{bmatrix} \dfrac{-L_d + L_q}{2} \\ \dfrac{L_q}{2} \end{bmatrix}\cdot 2\Delta\theta \, v_{dh} = \begin{bmatrix} \dfrac{1}{L_d} \\ \dfrac{L_q}{L_d L_q}\Delta\theta \end{bmatrix} v_{dh} \quad \text{[Expression 5]}$$

According to the foregoing [Expression 5], it is found that a qc-axis harmonic electric current $i_{qc}$ varies depending on the rotation-phase-angle error $\Delta\theta$. By performing transformation with regard to a qc-axis component, it is possible to express the rotation-phase-angle error $\Delta\theta$ as the following [Expression 6].

[Mathematical 7]

$$\Delta\theta = \frac{L_d L_q}{L_q - L_d} \cdot \frac{p i_{qc}}{v_{dh}}$$ [Expression 6]

The rotation-phase-angle error calculator 181 calculates and outputs the rotation-phase-angle error $\theta\Delta\theta_{est}$ using the above-described characteristics of rotation-angle dependence.

The PI controller 182 calculates and outputs the rotation-speed estimation value $\omega_{est}$ by exercising PI control so that the rotation-phase-angle error estimation value $\Delta\theta_{est}$ is zero.

The integrator 183 calculates and outputs the rotation phase angle $\theta_{est}$ by integrating the rotation-speed estimation value $\omega_{est}$.

Here, in a case where a rotation phase angle is estimated by superposition of a high-frequency voltage, attention should be given to a dynamic inductance of the synchronous motor M. For example, even in a salient-pole synchronous motor which rotates utilizing magnetic saliency, a difference between dynamic inductances ($L_q - L_d$) is extremely small in some cases, so that estimation of a rotation phase angle using the foregoing [Expression 6] may become difficult.

Specifically, in a case where a dynamic inductance which is a ratio ($\Delta\phi/\Delta I$) of a change $\Delta\phi$ in magnetic flux to a change $\Delta I$ in an electric current and a static inductance which is a ratio ($\phi/I$) of fundamental-wave magnetic flux $\phi$ to a fundamental wave current I are assumed to be different from each other, the voltage equation of [Expression 1] can be expressed as [Expression 7].

[Mathematical 8]

$$\begin{bmatrix} v_d \\ v_q \end{bmatrix} = \begin{bmatrix} R + pL_{dh} & -\omega_e L_{qa} \\ \omega_e L_{da} & R + pL_{qh} \end{bmatrix} \begin{bmatrix} i_d \\ i_q \end{bmatrix}$$ [Expression 7]

Here, in the foregoing [Expression 7], $L_{da}$ or $L_{qa}$ represents an inductance related to a fundamental wave current (i.e., static inductance), and $L_{dh}$ or $L_{qh}$ represents an inductance related to a change in an electric current (i.e., dynamic inductance).

Further, a high-frequency electric current in this case can be expressed by the following [Expression 8].

[Mathematical 9]

$$p\begin{bmatrix} i_{dc} \\ i_{qc} \end{bmatrix} =$$ [Expression 8]

$$\frac{1}{L_{dh}L_{qh}} \begin{bmatrix} L_{0h} - L_{1h}\cos 2\Delta\theta & -L_{1h}\sin 2\Delta\theta \\ -L_{1h}\sin 2\Delta\theta & L_{0h} + L_{1h}\cos 2\Delta\theta \end{bmatrix} \begin{bmatrix} v_{dc} \\ v_{qc} \end{bmatrix}$$

In the expression, $$L_{0h} = \frac{(L_{dh} + L_{qh})}{2} \quad L_{1h} = \frac{(L_{dh} - L_{qh})}{2}$$

Moreover, if a high-frequency voltage is applied to only a dc-axis which is an estimated d-axis, [Expression 8] can be expressed as [Expression 9].

[Mathematical 10]

$$p\begin{bmatrix} i_{dc} \\ i_{qc} \end{bmatrix} = \frac{1}{L_{dh}L_{qh}} \begin{bmatrix} -L_{dh} \\ \frac{-L_{dh} + L_{qh}}{2} \cdot 2\Delta\theta \end{bmatrix} v_{dh}$$ [Expression 9]

Each of a d-axis and a q-axis can be rewritten as follows.

[Mathematical 11]

$$pi_{dc} = \frac{v_{dh}}{L_{dh}}$$ [Expression 10]

$$pi_{qc} = \frac{L_{qh} - L_{dh}}{L_{dh}L_{qh}} \Delta\theta \cdot v_{dh}$$ [Expression 11]

By transformation of the foregoing [Expression 11], the rotation-phase-angle error estimation value $\Delta\theta$ is expressed by the following [Expression 12].

[Mathematical 12]

$$\Delta\theta = \frac{L_{dh}L_{qh}}{L_{qh} - L_{dh}} \cdot \frac{i_{qch}}{v_{dh}}$$ [Expression 12]

In a case where a difference (which will be hereinafter referred to as a "salient-pole difference") between dynamic inductances found in a denominator of the foregoing [Expression 12] is small, a quantity of characteristics in accordance with the rotation-phase-angle error estimation value $\Delta\theta$ cannot be grasped, so that calculation of the rotation-phase-angle estimation value $\theta_{est}$ becomes difficult.

FIG. 13A is a view showing examples of a d-axis electric current and a q-axis electric current in a case where an electric current flowing through a synchronous motor is approximately zero.

FIG. 13B is a view showing examples of a d-axis dynamic inductance and a q-axis dynamic inductance in a case where an electric current flowing through a synchronous motor is approximately zero.

As shown in FIG. 13A, a d-axis electric current greatly varies due to superposition of a high-frequency voltage on a d-axis voltage command. On the other hand, as shown in FIG. 13B, a salient-pole difference is extremely small. Specifically, in a case where no electric current is supplied to the synchronous motor M (an electric current is approximately zero), magnetic saturation of the synchronous motor M does not occur, so that a salient-pole difference between the d-axis dynamic inductance $L_{dh}$ and the q-axis dynamic inductance $L_{qh}$ is approximately zero. Accordingly, a denominator in the foregoing [Expression 12] inevitably becomes equal to approximately zero.

Under the foregoing circumstances, when the rotation-phase-angle estimation value $\theta_{est}$ was calculated using [Expression 12], the rotation-phase-angle error estimation value $\Delta\theta_{est}$ did not converge on zero and the rotation-phase-angle estimation value $\theta_{est}$ could not be calculated accurately in some cases. It is considered that this is because a denominator of [Expression 12] is equal to approximately zero and an inductance related to an electric current significantly fluctuates in a state where a rotor of the synchronous motor M is magnetically saturated insufficiently.

In view of this, in the inverter control apparatus 100 and the motor drive system according to the present embodiment, a fundamental wave current which is synchronous with a rotor speed and has a magnitude equal to or greater than a threshold is supplied in a −d-axis direction.

At that time, a magnitude of a d-axis electric current being supplied to the synchronous motor M is set so as to allow a d-axis dynamic inductance to be sufficiently saturated, and a limit ($i_{dmini}$) of a d-axis electric current being supplied is set such that a d-axis dynamic inductance is equal to or lower than a d-axis static inductance at a rated operation time, for example. By supplying a fundamental wave current of a magnitude which is equal to or greater than a predetermined threshold, to the synchronous motor M, it is possible to allow magnetic saturation of the rotor 20 to proceed.

Figure 14A:
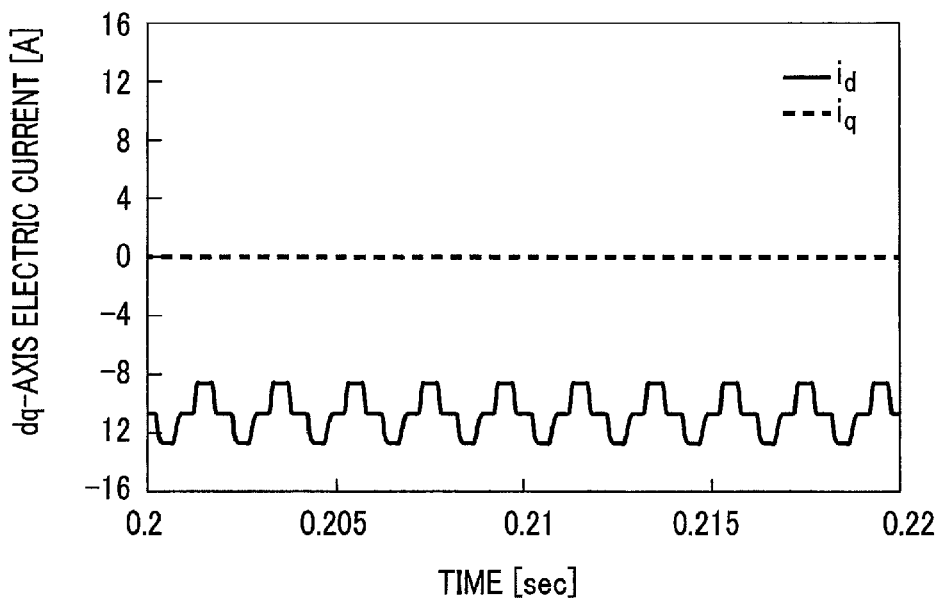
FIG. 14A is a view showing examples of a d-axis electric current and a q-axis electric current in a case where a fundamental wave current synchronous with a speed of a rotor is supplied to a synchronous motor.

FIG. 14A is a view showing examples of a d-axis electric current and a q-axis electric current in a case where a fundamental wave current synchronous with a rotor speed is supplied to a synchronous motor.

Figure 14B:
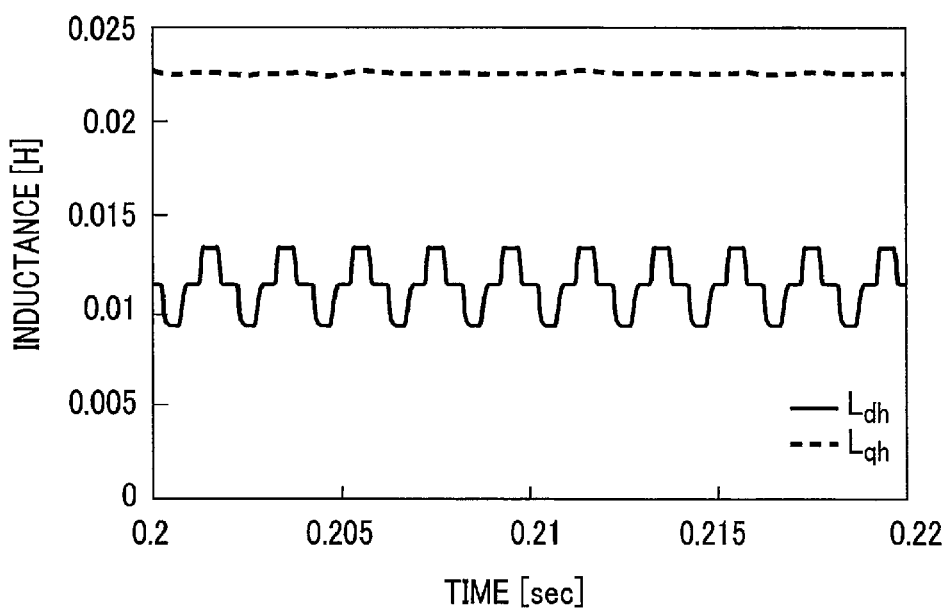
FIG. 14B is a view showing examples of a d-axis dynamic inductance and a q-axis dynamic inductance in a case where the d-axis electric current and the q-axis electric current shown in FIG. 14A are supplied to a synchronous motor.

FIG. 14B is a view showing examples of a d-axis dynamic inductance and a q-axis dynamic inductance in a case where the d-axis electric current and the q-axis electric current shown in FIG. 14A are supplied to a synchronous motor.

By referring to FIGS. 14A and 14B, it is found that when a fundamental wave current which is synchronous with a rotor speed and has a predetermined magnitude is supplied in a −d-axis direction, a rotor of the synchronous motor M is magnetically saturated sufficiently and a magnetic-salient-pole difference becomes greater than that in a case where an electric current is zero.

Under such circumstances, when the rotation-phase-angle estimation value $θ_{est}$ was calculated using the foregoing [Expression 12], the rotation-phase-angle error estimation value $Δθ_{est}$ converged on zero within a predetermined time and a rotation phase angle could be stably estimated.

FIG. 15 is a view showing an example of dynamic-inductance characteristics in a case where a phase-angle error estimation value is 90°.

It is noted that a fundamental wave current is supplied to not only a d-axis but also a q-axis in some cases, depending on when an inverter is activated. Also in such cases, as shown in FIG. 15, by supplying a fundamental wave current toward a dc-axis, it is possible to allow saturation of a d-axis dynamic inductance to proceed on account of leakage of q-axis magnetic flux, so that a magnetic-salient-pole difference can be obtained.

FIG. 16 is a view showing examples of a d-axis dynamic inductance and a q-axis dynamic inductance in a case where the rotation-phase-angle error estimation value is 90° and an electric current flowing through a synchronous motor is approximately zero.

FIG. 17 is a view showing examples of a d-axis dynamic inductance and a q-axis dynamic inductance in a case where the rotation-phase-angle error estimation value is 90° and an electric current is supplied to a synchronous motor toward a dc-axis.

Comparison between FIGS. 16 and 17 indicates that a magnetic-salient-pole difference in a case where the synchronous motor M was not energized was smaller than that in a case where a predetermined electric current was supplied to the synchronous motor M toward a dc-axis. Accordingly, even when an error occurred in estimation of a phase angle, a magnetic-salient-pole difference could be obtained by a method in which a high-frequency voltage is superposed on a voltage command value, and a rotation-phase-angle estimation value and a speed estimation value could be calculated.

That is, according to the present embodiment, an inverter control apparatus and a motor drive system which accurately control an electric current can be provided.

It is noted that though a method in which a high-frequency voltage is superposed on a dc-axis voltage command and a q-axis high-frequency electric current is detected has been described in the present embodiment, a method is not limited to the foregoing one. The same effects as produced in the present embodiment can be produced by any method that allows calculation of a rotation-phase-angle estimation value, such as a method in which both of a dc-axis electric current and a qc-axis electric current are detected, or a method in which a high-frequency voltage is superposed on both of a dc-axis voltage command and a qc-axis voltage command.

Next, an inverter control apparatus and a motor drive system according to a second embodiment will be described with reference to the drawings. It is noted that in the following description, elements similar to those in the above-described first embodiment will be denoted by the same reference signs, and description thereof will be omitted.

FIG. 18 is a block diagram schematically showing a configuration example of the inverter control apparatus and the motor drive system according to the second embodiment.

The motor drive system according to the present embodiment includes a synchronous motor M, an inverter main circuit INV, an inverter control apparatus 100, and a host controller CTR. The inverter control apparatus 100 includes an electric-current detector SS, a command generator 110, an electric-current controller 120, coordinate converters 140 and 160, a modulator 150, and a rotation-phase-angle/speed estimator (second rotation-phase-angle/speed estimator) 180.

The synchronous motor M is a synchronous motor including a rotor which is magnetically salient, and is a synchronous reluctance motor, for example. As the synchronous motor M, a permanent-magnet synchronous motor using a magnet, a synchronous reluctance motor, a wound-field synchronous motor which supplies magnetic flux of a field using a secondary winding, or the like can be employed. In the present embodiment, an example in which a synchronous reluctance motor is employed as the synchronous motor M will be described.

The inverter main circuit INV includes a direct-current power source (direct-current load) and two switching elements for each of a U-phase, a V-phase, and a W-phase. The two switching elements for each phase are connected in series between a direct-current line which is connected to a positive pole of the direct-current power source, and a direct-current line which is connected to a negative pole of the direct-current power source. Operations of the switching elements of the inverter main circuit INV are controlled by a gate command received from the modulator 150. The inverter main circuit INV is a three-phase alternating-current inverter which outputs a U-phase electric current $I_u$, a V-phase electric current $I_v$, and a W-phase electric current $I_w$ at a predetermined frequency, to the synchronous motor M which is an alternating-current load, in accordance with a gate command. Also, the inverter main circuit INV can charge a secondary battery which is a direct-current power source, with electric power generated in the synchronous motor M.

In the present embodiment, a method in which a set value of a motor parameter is used in calculation for estimation of a rotation-phase-angle error is employed. The method of calculating a rotation-phase-angle estimation value used in the present embodiment is suitable for estimation of a rotation phase angle in a case where the synchronous motor M rotates at a high speed.

Figure 19:
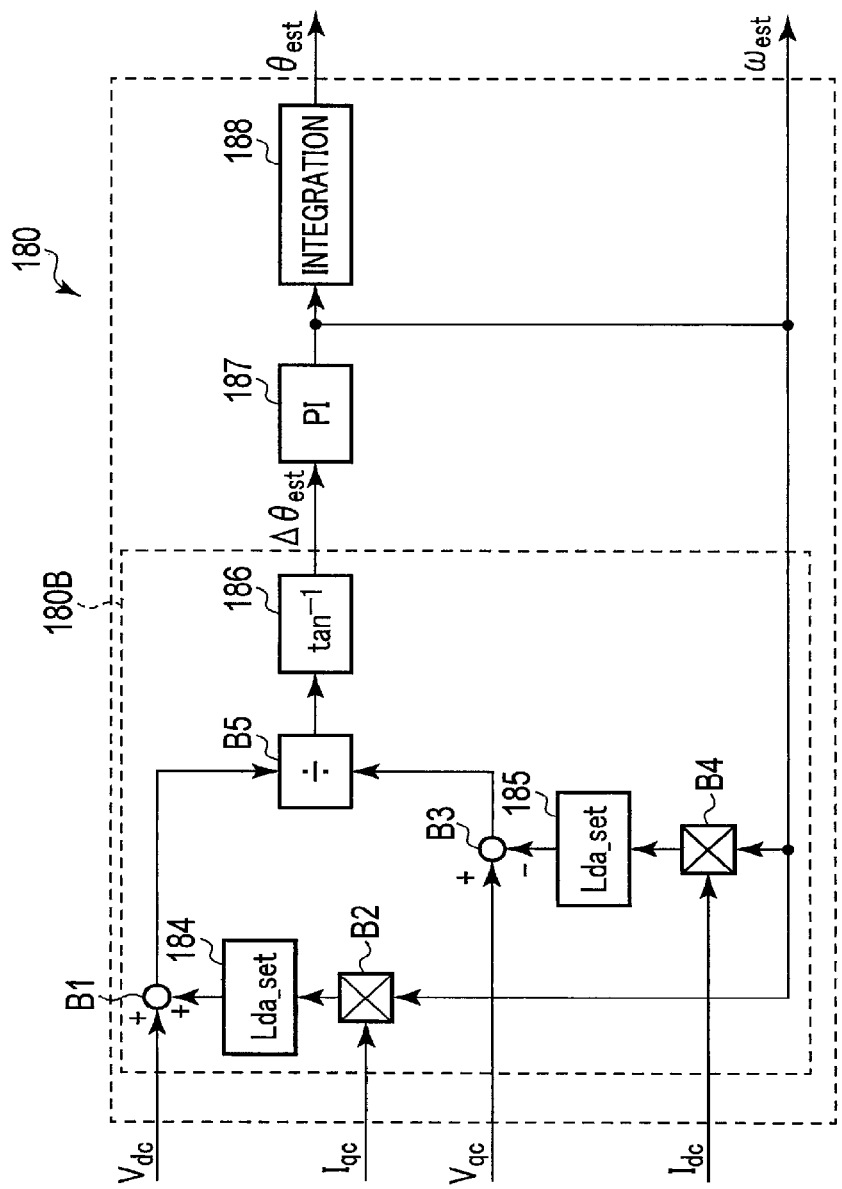
FIG. 19 is a block diagram schematically showing a configuration example of a rotation-phase-angle/speed estimator shown in FIG. 18.

FIG. 19 is a block diagram schematically showing a configuration example of the rotation-phase-angle/speed estimator shown in FIG. 18.

In the present embodiment, the rotation-phase-angle/speed estimator 180 calculates a rotation-phase-angle error $\Delta\theta_{est}$ using voltage command $V_{dc}$ and $V_{qc}$, detected electric-current values $I_{dc}$ and $I_{qc}$ (or electric-current commands $I_{dref}$ and $I_{qref}$), and a set value $L_{da\_set}$ of a static dynamic inductance.

The rotation-phase-angle/speed estimator 180 includes a second phase-angle error estimator 180B which calculates the rotation-phase-angle error estimation value $\Delta\theta_{est}$ using an extended induced voltage, for example, a PI controller 187, and an integrator 188.

Whereas the foregoing [Expression 2] is used as a voltage equation in the first embodiment, the expression can be rewritten in terms of an extended induced voltage, as the following [Expression 13].

[Mathematical 13]

$$\begin{bmatrix} v_d \\ v_q \end{bmatrix} = \begin{bmatrix} R + p(L_d - L_q) + pL_q & \omega(L_d - L_q) - \omega L_d \\ \omega L_d & R + pL_q \end{bmatrix} \begin{bmatrix} i_d \\ i_q \end{bmatrix} \quad \text{[Expression 13]}$$

$$= \begin{bmatrix} R + pL_q & -\omega L_d \\ \omega L_d & R + pL_q \end{bmatrix} \begin{bmatrix} i_d \\ i_q \end{bmatrix} + E_x \begin{bmatrix} 1 \\ 0 \end{bmatrix}$$

Here, an extended induced voltage Ex in the foregoing [Expression 13] can be represented by the following expression.

$$E_x = (L_d - L_q)(pi_{dc} + \omega i_{qc}) \quad \text{[Mathematical 14]}$$

Further, in a case where an error occurs in a rotation phase angle, [Expression 13] can be represented by [Expression 14].

[Mathematical 15]

$$\begin{bmatrix} v_{dc} \\ v_{qc} \end{bmatrix} = \begin{bmatrix} R + pL_q & -\omega L_d \\ \omega L_d & R + pL_q \end{bmatrix} \begin{bmatrix} i_{dc} \\ i_{qc} \end{bmatrix} + E_x \begin{bmatrix} \cos\Delta\theta \\ \sin\Delta\theta \end{bmatrix} \quad \text{[Expression 14]}$$

Further, to transform [Expression 14] results in the following [Expression 15].

[Mathematical 16]

$$\begin{bmatrix} E_x \cos\Delta\theta \\ E_x \sin\Delta\theta \end{bmatrix} = \begin{bmatrix} v_{dc} \\ v_{qc} \end{bmatrix} - \begin{bmatrix} R + pL_q & -\omega L_d \\ \omega L_d & R + pL_q \end{bmatrix} \quad \text{[Expression 15]}$$

When each of a d-axis and a q-axis in the foregoing [Expression 15] is divided, [Expression 16] is provided.

[Mathematical 17]

$$\frac{E_x \sin\Delta\theta}{E_x \cos\Delta\theta} = \tan\Delta\theta \quad \text{[Expression 16]}$$

$$= \frac{v_{qc} - \omega_{est} L_d i_{dc} - (R + pL_q) i_{qc}}{v_{dc} - (R + pL_q) i_{dc} + \omega_{est} L_d i_{qc}}$$

Moreover, by obtaining an arc tangent of [Expression 16], it is possible to calculate the rotation-phase-angle error $\Delta\theta$ by [Expression 17].

[Mathematical 18]

$$\Delta\theta = \tan^{-1}\left\{\frac{v_{qc} - \omega_{est} L_d i_{dc} - (R + pL_q) i_{qc}}{v_{dc} - (R + pL_q) i_{dc} + \omega_{est} L_d i_{qc}}\right\} \quad \text{[Expression 17]}$$

The foregoing [Expression 17] can be rewritten as the following [Expression 18] in a case a rotation speed of the synchronous motor M is sufficiently high and a change in an electric current is fully negligible.

[Mathematical 19]

$$\Delta\theta = \tan^{-1}\left\{\frac{v_{qc} - \omega_{est} L_q i_{dc} - R i_{qc}}{v_{dc} - R i_{dc} + \omega_{est} L_d i_{qc}}\right\} \quad \text{[Expression 18]}$$

Also, [Expression 18] can be written as [Expression 19] because a set value is used as a motor parameter actually.

[Mathematical 20]

$$\Delta\theta = \tan^{-1}\left\{\frac{v_{qc} - \omega_{est} L_{d\_set} i_{dc} - R_{\_set} i_{qc}}{v_{dc} - R_{\_set} i_{dc} + \omega_{est} L_{d\_set} i_{qc}}\right\} \quad \text{[Expression 19]}$$

Here, $R_{\_set}$ represents a set value of resistance, and $L_{d\_set}$ represents a set value of a d-axis inductance.

Further, in a case where voltage drop due to resistance is negligible, the foregoing [Expression 19] can be rewritten as [Expression 20].

[Mathematical 21]

$$\Delta\theta = \tan^{-1}\left\{\frac{v_{qc} - \omega_{est} L_{d\_set} i_{dc}}{v_{dc} + \omega_{est} L_{d\_set} i_{qc}}\right\} \quad \text{[Expression 20]}$$

The second phase-angle error estimator 180B calculates the rotation-phase-angle error estimation value $\Delta\theta_{est}$ using the foregoing [Expression 20].

Specifically, a multiplier B2 multiplies a qc-axis electric-current command $I_{qc}$ and a rotation-speed estimation value $\omega_{est}$, and outputs its result. An output of the multiplier B2 is supplied to an inductance setting unit 184. The inductance setting unit 184 multiplies an input value ($I_{qc} \times \omega_{est}$) and a set value $L_{da\_set}$ of d-axis static inductance, and outputs its result to an adder B1. The adder B1 adds the dc-axis voltage command $V_{dc}$ and an output ($I_{qc} \times \omega_{est} \times L_{da\_set}$) of the inductance setting unit 184, and outputs its result.

A multiplier B4 multiplies the dc-axis electric-current command $I_{dc}$ and the rotation-speed estimation value $\omega_{est}$, and outputs its result. An output of the multiplier B4 is supplied to an inductance setting unit 185. The inductance setting unit 185 multiplies an input value ($I_{dc} \times \omega_{est}$) and the set value $L_{da\_set}$ of d-axis static inductance, and outputs its result to a subtracter B3. The subtracter subtracts an output ($I_{dc} \times \omega_{est} \times L_{da\_set}$) of the inductance setting unit 185 from the qc-axis voltage command $V_{qc}$, and outputs its result.

A divider B5 divides an output of the subtracter B3 by an output of the adder B1, and outputs its result to an arctangent calculation unit 186. The arc-tangent calculation unit 186 calculates an arc tangent of a value output from the divider, and outputs its result as the rotation-phase-angle error estimation value $\Delta\theta_{est}$.

The PI controller 187 exercises PI control in such a manner that the rotation-phase-angle error estimation value $\Delta\theta_{est}$ converges on zero, and outputs the rotation-speed estimation value $\omega_{est}$.

The integrator 188 integrates the rotation-speed estimation value $\omega_{est}$ output from the PI controller 187, and calculates and outputs the rotation-phase-angle estimation value $\theta_{est}$.

Here, whereas a rotation-phase-angle error is calculated using the set value ($L_{da\_set}$) of d-axis static inductance according to the foregoing [Expression 13], a result of calculation of the rotation-phase-angle error estimation value $\Delta\theta_{est}$ converged on a phase which was not intended, so that the rotation-phase-angle estimation value $\theta_{est}$ could not be accurately calculated in some cases, because a d-axis static inductance ($L_{da}$) greatly varies depending on an electric current as shown in FIG. 4. Because of an increase of calculation load and limitation of a memory, it is not practical to use a table of the d-axis static inductance $L_{da}$ related to an electric current in order to improve accuracy in estimation, and to do so consequently might lead to increase of an error of a rotation-phase-angle estimation value.

In contrast thereto, in the present embodiment, an electric current is supplied while setting a limit to a command value of a d-axis electric current for which a static inductance greatly varies due to magnetic saturation, so that magnetic saturation in a d-axis direction always proceeds. This makes it possible to operate an inverter control apparatus and a motor drive system in a region where a static inductance does not greatly vary in the characteristics shown in FIG. 4, for example.

In this case, in an equation for calculating the rotation-phase-angle error estimation value $\Delta\theta_{est}$, only the d-axis static inductance $L_{da}$ during magnetic saturation is set, so that a rotation phase angle can be accurately estimated. Further, a complicated process using a table or the like is not performed, so that a processing time required to estimate a phase angle is reduced, and ease of adjustment is improved.

Also, though in the present embodiment, an equation of a d-axis and an equation of a q-axis are divided and an arc tangent is obtained to calculate a rotation-phase-angle error in the method using an extended induced voltage, a method is not limited to one using the foregoing equations. The same effects are produced also by a method in which a rotation phase angle is estimated based on a result of subtraction of a model voltage (a voltage calculated from a voltage command value using a motor model, which is synonymous with a feedforward voltage).

For example, to give an attention to a q-axis direction in the foregoing [Expression 15] results in the following [Expression 21].

[Mathematical 22]

$$\sin\Delta\theta = \frac{v_{qc} - \omega_{est}L_{da\_set}i_{dc} - R_{set}i_{qc}}{E_x} \qquad \text{[Expression 21]}$$

Further, in a case where the rotation-phase-angle error estimation value $\Delta\theta_{est}$ is small and voltage drop due to resistance is negligible, the following [Expression 22] is provided.

[Mathematical 23]

$$\Delta\theta = \frac{v_{qc} - \omega_{est}L_{da\_set}i_{dc}}{E_x} \qquad \text{[Expression 22]}$$

As expressed in the foregoing [Expression 22], it is possible to calculate the rotation-phase-angle error estimation value $\Delta\theta_{est}$ by providing the set value $L_{da\_set}$ only for a static inductance in a d-axis direction.

That is, according to the present embodiment, an inverter control apparatus and a motor drive system which can accurately control an electric current can be provided.

Next, an inverter control apparatus and a motor drive system according to a third embodiment will be described with reference to the drawings. In the inverter control apparatus and the motor drive system according to the present embodiment, a method of estimating a rotation-phase-angle/speed is changed depending on a speed.

FIG. 20 is a block diagram schematically showing a configuration example of the inverter control apparatus and the motor drive system according to the third embodiment.

A command generator 110 outputs a control changeover signal flg based on a rotation-speed estimation value $\omega_{est}$ which is supplied from a rotation-phase-angle/speed estimator 180.

The rotation-phase-angle/speed estimator 180 changes a method of estimating a rotation phase angle or speed based on a value of the control changeover signal flg.

FIG. 21 is a block diagram schematically showing a configuration example of the command generator 110 shown in FIG. 20.

The command generator 110 further includes a lowpass filter FLT and a threshold determining unit 117, in addition to the elements in the command generator 110 in the above-described first embodiment. It is noted that a limiting unit 112 shown in FIG. 21 is configured in the same manner as the limiting unit 112 shown in FIG. 6.

The lowpass filter FLT receives the rotation-speed estimation value $\omega_{est}$, removes a high-frequency component therefrom, and outputs its result to the threshold determining unit 117.

The threshold determining unit 117 compares the rotation-speed estimation value $\omega_{est}$ which is input, with a predetermined threshold, and outputs "1" as the control changeover signal flg when the rotation-speed estimation value $\omega_{est}$ is equal to or smaller than the predetermined threshold, while outputting "0" as the control changeover signal flg when the rotation-speed estimation value $\omega_{est}$ is smaller than the predetermined threshold.

FIG. 22 is a view for explaining another configuration example of the threshold determining unit shown in FIG. 21.

In a threshold determining unit 117', for example, a threshold (first threshold Th1) used for switching the control changeover signal flg from "0" to "1" (changing a rotation speed from a high speed to a low speed) and a threshold (second threshold Th2 larger than the first threshold Th1) used for switching the control changeover signal flg from "1" to "0" (changing a rotation speed from a low speed to a high speed) are made different from each other. By switching the control changeover signal flg using a plurality of thresholds in the above-described manner, it is possible to prevent a value of the control changeover signal flg from becoming unstable in the vicinity of a threshold, so that stable control can be achieved.

Figure 23:
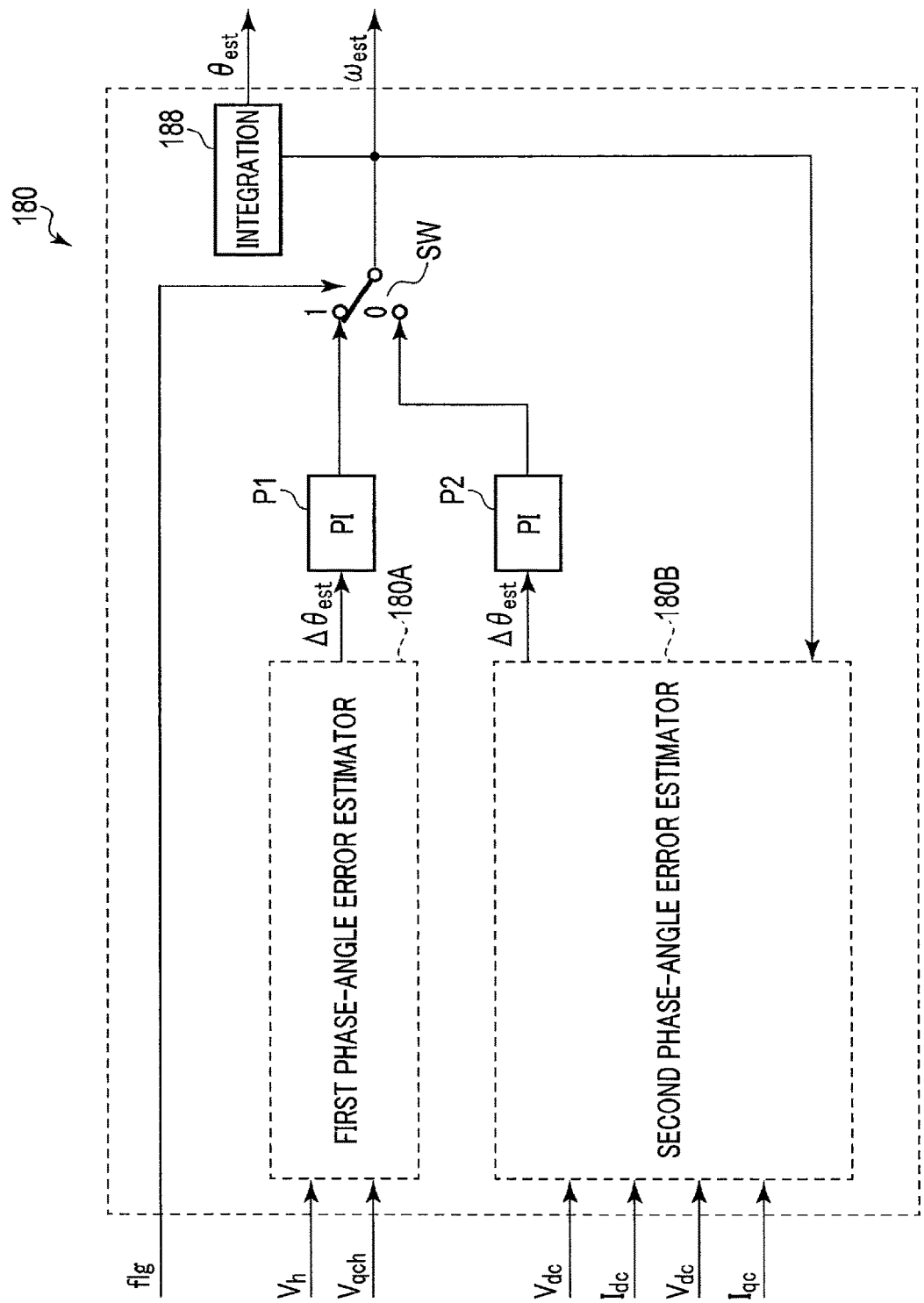
FIG. 23 is a block diagram schematically showing a configuration example of a rotation-phase-angle/speed estimator shown in FIG. 20.

FIG. 23 is a block diagram schematically showing a configuration example of the rotation-phase-angle/speed estimator shown in FIG. 20.

The rotation-phase-angle/speed estimator 180 includes a first phase-angle error estimator 180A which calculates a rotation-phase-angle error estimation value $\Delta\theta_{est}$ using a high-frequency voltage signal and a high-frequency electric current, a second phase-angle error estimator 180B which calculates the rotation-phase-angle error estimation value $\Delta\theta_{est}$ using a voltage command and an electric-current command or a detected electric-current value, P controllers P1 and P2, a switch SW, and an integrator 188.

The first phase-angle error estimator 180A corresponds to the first phase-angle error estimator 180A of the rotation-phase-angle/speed estimator 180 of the first embodiment shown in FIG. 11.

The second phase-angle error estimator 180B corresponds to the second phase-angle error estimator 180B of the rotation-phase-angle/speed estimator 180 of the second embodiment shown in FIG. 18.

The PI controller P1 includes a PI controller which calculates a rotation-speed estimation value so that the rotation-phase-angle error estimation value $\Delta\theta_{est}$ output from the first phase-angle error estimator 180A is equal to zero, and outputs its result.

The PI controller P2 includes a PI controller which calculates a rotation-speed estimation value $\omega_{est}$ so that the rotation-phase-angle error estimation value $\Delta\theta_{est}$ output from the second phase-angle error estimator 180B is equal to zero, and outputs its result.

The switch SW changes electrical connection between an input terminal and an output terminal in accordance with a value of the control changeover signal flg. The switch SW includes a first input terminal to which the rotation-speed estimation value $\omega_{est}$ supplied from the PI controller P1 is input, a second input terminal to which the rotation-speed estimation value $\omega_{est}$ supplied from the PI controller P2 is input, and an output terminal. The switch SW electrically connects the first input terminal and the output terminal when the control changeover signal flg is "1", and electrically connects the second input terminal and the output terminal when the control changeover signal flg is "0".

The integrator 188 integrates the rotation-speed estimation value $\omega_{est}$ output from the switch SW, and outputs the rotation-phase-angle estimation value $\theta_{est}$.

Figure 24:
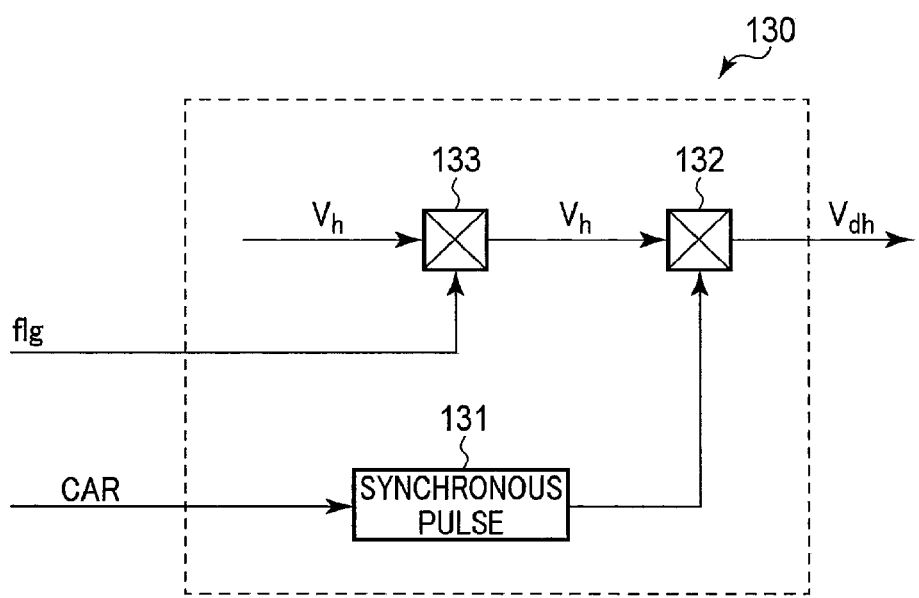
FIG. 24 is a block diagram schematically showing a configuration example of a high-frequency-voltage superposing unit shown in FIG. 20.

FIG. 24 is a block diagram schematically showing a configuration example of the high-frequency-voltage superposing unit shown in FIG. 20.

The high-frequency-voltage superposing unit 130 further includes a logical-AND operation unit 133 which outputs a logical AND of the control changeover signal flg and a voltage $V_h$ serving as a command for a direct-current voltage of a predetermined magnitude. An output of the logical-AND operation unit 133 is supplied to a logical-AND operation unit 132, and the voltage $V_h$ is output only when the control changeover signal flg is "1". In other words, in the first phase-angle error estimator 180A, a high-frequency voltage $V_{dh}$ is output only when the rotation-phase-angle error estimation value $\Delta\theta_{est}$ is calculated.

With the inverter control apparatus and the motor drive system according to the present embodiment, while magnetic saturation is allowed to proceed by setting of an upper limit to an electric-current amplitude only in a d-axis direction, an electric current keeps flowing due to setting of a limit to an electric-current amplitude in a d-axis direction when a rotation speed of the synchronous motor M increases, so that an induced voltage is caused. Thus, a shift from estimation of a phase angle in the first phase-angle error estimator 180A (a low-speed rotating time) to estimation of a phase angle in the second phase-angle error estimator 180B (a high-speed rotating time) can be smoothly achieved.

Also, in calculating the rotation-phase-angle error estimation value $\Delta\theta_{est}$ in the first phase-angle error estimator 180A, a noise is caused due to superposition of a high-frequency signal. However, in the present embodiment, when a rotation speed increases, an estimation method is changed from a method in which superposition of a high-frequency signal is used, so that a noise caused due to superposition of a high frequency can be reduced.

That is, according to the present embodiment, an inverter control apparatus and a motor drive system which accurately control an electric current can be provided.

Next, an inverter control apparatus and a motor drive system according to a fourth embodiment will be described with reference to the drawings.

FIG. 25 is a block diagram schematically showing a configuration example of the inverter control apparatus and the motor drive system according to the fourth embodiment.

The motor drive system according to the present embodiment includes a synchronous motor M, an inverter main circuit INV, an inverter control apparatus 100, and a host controller CTR. The inverter control apparatus 100 includes an electric-current detector SS, a command generator 110, an electric-current controller 120, coordinate converters 140 and 160, a modulator 150, an angle/speed detector 210, and an angle sensor 200.

The synchronous motor M is a synchronous motor including a rotor which is magnetically salient, and is a synchronous reluctance motor, for example. As the synchronous motor M, a permanent-magnet synchronous motor using a magnet, a synchronous reluctance motor, a wound-field synchronous motor which supplies magnetic flux of a field using a secondary winding, or the like can be employed. In the present embodiment, an example in which a synchronous reluctance motor is employed as the synchronous motor M will be described.

The inverter main circuit INV includes a direct-current power source (direct-current load) and two switching elements for each of a U-phase, a V-phase, and a W-phase. The two switching elements for each phase are connected in series between a direct-current line which is connected to a positive pole of the direct-current power source, and a direct-current line which is connected to a negative pole of the direct-current power source. Operations of the switching elements of the inverter main circuit INV are controlled by a gate command received from the modulator 150. The inverter main circuit INV is a three-phase alternating-current inverter which outputs a U-phase electric current $I_u$, a V-phase electric current $I_v$, and a W-phase electric current $I_w$ at a predetermined frequency, to the synchronous motor M which is an alternating-current load, in accordance with a gate command. Also, the inverter main circuit INV can charge a secondary battery which is a direct-current power source, with electric power generated in the synchronous motor M.

The angle sensor 200 is attached to the synchronous motor M, and detects an angle of a rotor of the synchronous motor M. For the angle sensor 200, a resolver can be used, for example.

The angle/speed detector 210 corrects an angle of a rotor of the synchronous motor M, the angle being detected by the angle sensor 200, and calculates a rotation phase angle θ and a rotation speed ω.

FIG. 26 is a block diagram schematically showing a configuration example of the electric-current controller shown in FIG. 25.

The electric-current controller 120 includes a PI controller 122 which outputs a d-axis voltage command $V_d$ so that a difference between a d-axis electric-current command $I_{dref}$ and a d-axis electric-current $I_d$ is equal to zero, a PI controller 123 which outputs a q-axis voltage command $V_q$ so that a difference between a q-axis electric-current command $I_{qref}$ and a q-axis current $I_q$ is equal to zero, and a feed-forward-voltage calculation unit 121.

In designing an electric-current control system, an object being controlled (plant) is regarded as a first-order lag system in some cases. In order to regard the synchronous motor M as a first-order lag system, conceived is a method in which a voltage term (interference term) due to reaction of an armature is compensated for in a feedforward manner. A voltage equation of the synchronous motor M is the foregoing [Expression 1], and a feedforward voltage can be calculated by the following [Expression 23].

[Mathematical 24]

$$\begin{bmatrix} v_d \\ v_q \end{bmatrix} = \begin{bmatrix} R + pL_{dh} & -\omega_e L_{qa} \\ \omega_e L_{da} & R + pL_{qh} \end{bmatrix} \begin{bmatrix} i_d \\ i_q \end{bmatrix} \quad \text{[Expression 1]}$$

$$\begin{bmatrix} v_{d\_FF} \\ v_{q\_FF} \end{bmatrix} = \begin{bmatrix} 0 & -\omega_e L_{qa\_set} \\ \omega_e L_{da\_set} & 0 \end{bmatrix} \begin{bmatrix} i_{dc} \\ i_{qc} \end{bmatrix} \quad \text{[Expression 23]}$$

To do a subtraction regarding [Expression 1] and [Expression 23] results in the following [Expression 24].

[Mathematical 25]

$$\begin{bmatrix} v_{dPI} \\ v_{qPI} \end{bmatrix} = \begin{bmatrix} R + pL_{dh} & -\omega_e(L_{qa} - L_{qa\_set}) \\ \omega_e(L_{da} - L_{da\_set}) & R + pL_{qh} \end{bmatrix} \begin{bmatrix} i_d \\ i_q \end{bmatrix} \quad \text{[Expression 24]}$$

In this regard, [Expression 24] means an output of an electric-current PI controller.

At that time, assuming that a motor parameter is equal to a set value, i.e., $L_{da}$ is equal to $L_{da\_set}$ and $L_{qa}$ is equal to $L_{qa\_set}$, [Expression 24] is transformed to [Expression 25].

[Mathematical 26]

$$\begin{bmatrix} v_{dPI} \\ v_{qPI} \end{bmatrix} = \begin{bmatrix} R + pL_{dh} & 0 \\ 0 & R + pL_{qh} \end{bmatrix} \begin{bmatrix} i_d \\ i_q \end{bmatrix} \quad \text{[Expression 25]}$$

Further, when [Expression 25] is transformed, [Expression 26] and [Expression 27] are provided.

[Mathematical 27]

$$i_d = \frac{v_{dPI}}{R + pL_{dh}} \quad \text{[Expression 26]}$$

$$i_q = \frac{v_{qPI}}{R + pL_{qh}} \quad \text{[Expression 27]}$$

According to the foregoing [Expression 26] and [Expression 27], it is understood that a plant is a first-order lag system.

Further, consider a case in which PI control is exercised to control an electric current in the foregoing expressions. A d-axis loop transfer function in a case where PI control is exercised is represented by the following [Expression 28].

[Mathematical 28]

$$i_{dRef} = \frac{K_{pd}\left(1 + \frac{1}{s\tau_A}\right)\frac{1}{R}\frac{1}{(1 + s\tau_d)}}{1 + K_{pd}\left(1 + \frac{1}{s\tau_A}\right)\frac{1}{R}\frac{1}{(1 + s\tau_d)}} i_{dc} \quad \text{[Expression 28]}$$

In the expression, $\tau_A$ represents an arbitrary time constant, s:p represents a differential operator, and $K_{pd}$ represents a d-axis proportional gain.

When the foregoing [Expression 28] is transformed into a form of a transfer function, the following [Expression 29] is provided.

[Mathematical 29]

$$\frac{i_{dRef}}{i_{dc}} = \frac{K_{pd}\left(\frac{1 + s\tau_A}{s\tau_A}\right)\frac{1}{R}\frac{1}{(1 + s\tau_d)}}{1 + K_{pd}\left(\frac{1 + s\tau_A}{s\tau_A}\right)\frac{1}{R}\frac{1}{(1 + s\tau_d)}} \quad \text{[Expression 29]}$$

Here, when a PI controller is designed such that $\tau_A$ is equal to $\tau_d$, the foregoing [Expression 29] is transformed to the following [Expression 30].

[Mathematical 30]

$$\frac{i_{dRef}}{i_{dc}} = \frac{1}{1 + \frac{R}{K_{pd}}s\tau_A} = \frac{1}{1 + s\tau_{new}} \quad \text{[Expression 30]}$$

By designing a PI controller as expressed by the foregoing [Expression 30], it is possible to regard a synchronous motor as a plant with an arbitrary time constant $\tau_{new}$, so that an electric current can be controlled by adjustment of a gain $K_{pd}$.

Here, it is assumed that $L_{da}$ is equal to $L_{da\_set}$ and $L_{qa}$ is equal to $L_{qa\_set}$ at a time when [Expression 25] is provided above, and those values greatly vary depending on operating conditions (magnetic saturation) as described above. In a case where those values are not equal, a control system cannot be designed as a plant having an arbitrary time constant, so that a response as designed cannot be obtained.

FIG. 27 is a block diagram schematically showing a comparative example of an electric-current controller.

The electric-current controller 120 shown in FIG. 27 is configured such that a gain is variable depending on magnetic saturation, in order to obtain a response as designed. Since variation depending on operating conditions becomes particularly significant on a d-axis where a static inductance greatly varies due to magnetic saturation, a d-axis electric-current command $I_{dref}$ is supplied to a proportional controller P and an integral controller I of the PI controller 122.

Also, whereas a PI controller is designed such that an arbitrary time constant $\tau_A$ is equal to a time constant $\tau_d$ of a motor in the foregoing [Expression 30], a d-axis dynamic inductance $L_{dh}$ should be known in order to achieve such design, and those values, like the above-described static inductance, greatly vary under influence of magnetic saturation. Variation of a q-axis dynamic inductance $L_{qh}$ due to magnetic saturation is smaller than variation of the d-axis dynamic inductance $L_{dh}$ due to magnetic saturation. With regard to the d-axis dynamic inductance $L_{dh}$, the d-axis dynamic inductance $L_{dh}$ in a state where magnetic saturation proceeds is approximately ten times as great as the d-axis dynamic inductance $L_{dh}$ in a state where the synchronous motor M is not energized, for example. If a time constant of a plant varies ten-fold relative to a designed electric-current response, control over an electric current is lost, so that torque is unlikely to be accurately output.

In order to overcome those problems, a method using a magnetic saturation table is conceivable. However, this may probably cause problems of shortage of a memory and an excess over a certain processing time.

In contrast thereto, in the present embodiment, an upper limit to an amplitude of a d-axis electric current is set, so that a d-axis electric current is allowed to always flow. Thus, both of a d-axis dynamic inductance and a d-axis static inductance can be magnetically saturated and variation in a d-axis dynamic inductance and a d-axis static inductance can be reduced. Accordingly, a design of a d-axis PI control gain is simplified, and an electric current can be controlled as designed.

It is preferable to use a table or the like in a case where a q-axis dynamic inductance and a q-axis static inductance greatly vary. It is noted that whereas a q-axis inductance can be magnetically saturated, this situation should be avoided because both of a d-axis and a q-axis are magnetically saturated and torque cannot be output due to weakened magnetic saliency.

At that time, a d-axis electric current being supplied is set such that a d-axis dynamic inductance is sufficiently saturated, and for example, a limit of a d-axis electric current being supplied is set such that a d-axis dynamic inductance is equal to or lower than a d-axis static inductance at a rated operation time. A d-axis static/dynamic inductance at a rated operation time is nearly constant, and in a case where the method of the present embodiment is employed, a parameter is set based on a d-axis static/dynamic inductance at a rated operation time, to design a gain.

As described above, according to the present embodiment, an inverter control apparatus and a motor drive system which accurately control an electric current can be provided.

Though some embodiments of the present invention have been described, those embodiments have been shown as examples, and it is not intended to limit the scope of the invention. Those new embodiments can be carried out in the other various ways, and various omissions, replacement, and alterations can be made within a range not departing from essences of the present invention. Those embodiments and modifications thereof are included in the scope and essences of the present invention, and in the invention recited by the claims and a range of equivalents thereof.

In the above-described first to fourth embodiments, the inverter control apparatus may be formed of either hardware or software, or may be formed of a combination of hardware and software. For example, the inverter control apparatus may include one processor or a plurality of processors and a memory, and calculations performed in each element may be implemented by software. In any of those cases, the same effects as produced in the above-described first to fourth embodiments can be produced.

The invention claimed is:

1. An inverter control apparatus comprising:
an inverter main circuit that drives a synchronous motor;
an electric-current detector that detects an electric current flowing between the inverter main circuit and the synchronous motor;
a command generator that generates an electric-current command value of an output electric current that is output from the inverter main circuit to the synchronous motor, in accordance with a torque command that is supplied externally; and
an electric-current controller that generates a voltage command value for the inverter main circuit so that the electric-current command value and a detected electric-current value detected in the electric-current detector are equal to each other, wherein
the command generator comprises a limiting unit that sets, when an absolute value of the electric-current command value is smaller than a lower limit value, the absolute value of the electric-current command value to a value which is equal to the lower limit value, and generates the electric-current command value so that a fundamental wave current, an absolute value of an amplitude of which is equal to or greater than the lower limit, is supplied to the synchronous motor to saturate a rotor bridge unit of the synchronous motor magnetically, in driving the inverter main circuit.

2. The inverter control apparatus according to claim 1, wherein
the command generator comprises:
an electric-current command generator configured to generate a first d-axis electric-current command value according to the torque command;
the limiting unit configured to output an absolute value of a second d-axis electric-current command which is equal to an absolute value of a first d-axis electric-current command when an absolute value of the first d-axis electric-current command is equal to or greater than the lower limit, and output an absolute value of the second d-axis electric-current command which is equal to the lower limit when an absolute value of an amplitude of the first d-axis electric-current command is smaller than the lower limit;
a sign determining unit configured to output +1 when the first d-axis electric-current command is greater than zero, and output −1 when the first d-axis electric-current command is equal to or smaller than zero; and
a multiplier configured to multiply an absolute value of the second d-axis electric-current command and an output value of the sign determining unit, and output its result as the electric-current command value.

3. The inverter control apparatus according to claim 1, wherein
the electric-current command value is a value of an electric current that is supplied to the synchronous motor to saturate the rotor bridge unit of the synchronous motor magnetically as the d-axis is a vector axis on which a static inductance that is an amount of change of magnetic flux which is generated for a fundamental-wave-current value becomes the lowest.

4. The inverter control apparatus according to claim 1, wherein the synchronous motor is a motor that is magnetically salient, and a d-axis dynamic inductance in a case where the synchronous motor is energized based on the electric-current command value is equal to or lower than a d-axis static inductance at a rated operation time.

5. A motor drive system comprising:

a synchronous motor;

an inverter main circuit that drives the synchronous motor;

an electric-current detector that detects an electric current flowing between the inverter main circuit and the synchronous motor;

a command generator that generates an electric-current command value of an output electric current that is output from the inverter main circuit to the synchronous motor, in accordance with a torque command that is supplied externally; and an electric-current controller that generates a voltage command value for the inverter main circuit so that the electric-current command value and a detected electric-current value that is detected in the electric-current detector are equal to each other, wherein the command generator comprises a limiting unit that sets, when an absolute value of the electric-current command value is smaller than a lower limit value, the absolute value of the electric-current command value to a value which is equal to the lower limit value, and generates the electric-current command value so that a fundamental wave current, an absolute value of an amplitude of which is equal to or greater than the lower limit, is supplied to the synchronous motor to saturate a rotor bridge unit of the synchronous motor magnetically, in driving the inverter main circuit.

\* \* \* \* \*